United States Patent
Namba

(10) Patent No.: US 7,349,899 B2
(45) Date of Patent: Mar. 25, 2008

(54) DOCUMENT CLUSTERING DEVICE, DOCUMENT SEARCHING SYSTEM, AND FAQ PREPARING SYSTEM

(75) Inventor: Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 10/059,288

(22) Filed: Jan. 31, 2002

(65) Prior Publication Data

US 2003/0018629 A1    Jan. 23, 2003

(30) Foreign Application Priority Data

Jul. 17, 2001  (JP) .............................. 2001-217188

(51) Int. Cl.
*G06F 17/30* (2006.01)
(52) U.S. Cl. ......................................... 707/6; 715/513
(58) Field of Classification Search ............. 707/1–10, 707/100–104.1, 200–205; 725/76
See application file for complete search history.

(56) References Cited

U.S. PATENT DOCUMENTS

| 5,369,763 | A  | * | 11/1994 | Biles .............................. 707/3 |
| 6,029,195 | A  | * | 2/2000  | Herz .......................... 725/116 |
| 6,311,190 | B1 | * | 10/2001 | Bayer et al. ............. 707/104.1 |
| 6,631,370 | B1 | * | 10/2003 | Pekkanen ....................... 707/4 |
| 7,043,497 | B1 | * | 5/2006  | Carty et al. ................. 707/102 |
| 2002/0016797 | A1 | * | 2/2002 | Taysi .......................... 707/508 |

* cited by examiner

*Primary Examiner*—Mohammad Ali
(74) *Attorney, Agent, or Firm*—Staas & Halsey LLP

(57) ABSTRACT

The present invention provides a document clustering device which evaluates similarity between each document among documents and all the documents including the concerning document itself. And according to this evaluation result, the document clustering device divides the documents into non-hierarchical clusters. Thereby, the present invention realizes a document searching system which speedily retrieves a document satisfying a search condition from an accumulation of an enormous number of documents, and a FAQ preparing system which automatically prepares FAQ from an accumulation of an enormous number of sample questions and sample answers.

4 Claims, 17 Drawing Sheets

Fig.6 (a)

| WORD | DOCUMENT ID |
|---|---|
| word1 | id1, id2, id4, ··· |
| word2 | id1, id4, ··· |
| ⋮ | ⋮ |
| wordn | id2, id3, ··· |

Fig.6 (b)

| DOCUMENT ID CONCERNED | EVALUATION RESULT[DOCUMENT ID, SIMILARITY INDEX] |
|---|---|
| id1 | [id1, $S_{11}$], [id2, $S_{12}$], [id4, $S_{14}$], [id6, $S_{16}$], ··· |
| id2 | [id1, $S_{21}$], [id2, $S_{22}$], [id4, $S_{24}$], [id7, $S_{27}$], ··· |
| id3 | [id3, $S_{33}$], [id5, $S_{35}$], ··· |
| id4 | [id2, $S_{42}$], [id4, $S_{44}$], ··· |
| id5 | [id3, $S_{53}$], [id5, $S_{55}$], ··· |
| · | · |
| · | · |
| · | · |
| idm | |

Fig.9

| DOCUMENT ID | HIGHLY SIMILAR DOCUMENT | SIMILARITY |
|:---:|:---:|:---:|
| id 1 | id 2 | $S_{12}$ |
| id 2 | id 1 | $S_{21}$ |
| id 3 | id 5 | $S_{35}$ |
| id 4 | id 2 | $S_{42}$ |
| id 5 | id 3 | $S_{53}$ |
| . | . | . |
| . | . | . |
| . | . | . |
| id n | . | . |

Fig.11 (a)

| CLUSTER ID | DOCUMENT ID | NUMBER OF SAMPLES |
|---|---|---|
| 1 | id1, id2 | 2 |
| 2 | id3 | 1 |
| 3 | id6 | 1 |
| ⋮ | . | . |
| m | . | . |

Fig.11 (b)

| CLUSTER ID | DOCUMENT ID | NUMBER OF SAMPLES |
|---|---|---|
| 1 | id1, id2, id4 | 3 |
| 2 | id3, id5 | 2 |
| 3 | id6 | 1 |
| ⋮ | . | . |
| m | . | . |

Fig.14 (a)

| SAMPLE QUESTION ID | CLUSTER NOTE [CLUSTER ID, NUMBER OF SAMPLES] |
|---|---|
| id 1 | [1, 3] |
| id 2 | [1, 3] |
| id 3 | [2, 2] |
| id 4 | [1, 3] |
| id 5 | [2, 2] |
| . | . |
| . | . |
| . | . |
| id m | |

Fig.14(b)

| WORD | INDEX LIST [DOCUMENT ID, CLUSTER ID, NUMBER OF SAMPLES] |
|---|---|
| word 1 | [id1,1,3], [id2,1,3], [id4,1,3], ··· |
| word 2 | [id1,1,3], [id4,1,3], ··· |
| ⋮ | ⋮ |
| word n | [id2,1,3], [id3,2,2], ··· |

DOCUMENT CLUSTERING DEVICE, DOCUMENT SEARCHING SYSTEM, AND FAQ PREPARING SYSTEM

BACKGROUND OF THE INVENTION

1. Field of the Invention

The present invention relates to a document clustering device for appropriately classifying and managing an enormous number of questions and answers stored in a support center and the like and to a document searching system to which this document clustering device is applied. The present invention also relates to a FAQ preparing system for preparing combinations of frequently asked questions and answers, namely, FAQ by using the above document clustering device.

An enormous number of questions sent from users are received by a support center of a business organization and the like about specifications and usage of its products and it is demanded that an accurate answer is returned without delay to each of the questions.

For this purpose, a technique for appropriately managing accumulation of an enormous number of documents consisting of many questions which were sent from the users in the past and answers to the questions and for effectively utilizing the accumulated documents is in need.

2. Description of the Related Art

Systems as described in the following three examples have been conventionally used for returning answers to questions from users in a support center and the like.

In one conventional sample answer searching system, model answers prepared in advance are searched through, using similarity between the question sent from a user and model questions prepared in advance. In this first sample answer searching system, the model questions corresponding to the model answers in which countermeasures for various situations are respectively described are prepared.

In the first sample answer searching system, for example, according to the similarity obtained between the question from the user and each of the model questions, a model question which has the highest similarity is retrieved and a model answer corresponding to the retrieved model question is returned to the user.

In a second conventional system, an answer to be returned to a user is selected according to similarity between a question received from the user and model answers prepared in advance and according to the number of times each of the model answers is used as answers. In the second sample answer searching system like this, the number of times each of the model answers prepared in advance is used as answers is stored.

In this second sample answer searching system, commonality in described contents between the question received from the user and each of the model answers is first evaluated according to a score showing the similarity between the question and each of the model answers, and importance of each of the model answers is evaluated according to a score according to the number of times each of the model answers is used. For example, in this second sample answer searching system, a model answer which has been most frequently used is selected from model answers whose scores according to the similarity are relatively high, and the selected model answer is returned to the user.

In a third conventional system, the accumulation of answers used in the past itself is utilized as a set of sample answers to a new question. In the third sample answer searching system like this, the answers returned to questions which were received in the past are stored.

In this third sample answer searching system, the above-mentioned set of the sample answers itself is searched when a new question is inputted from a user so that a sample answer having a similar described content to that of the inputted question is extracted to be returned to the user.

FAQ presented to a user in a support center and the like has been conventionally prepared in a manner in which an appropriate question is extracted manually from an accumulation of received questions or typical questions are assumed regarding various items. Here, in the operation of preparing the FAQ according to the accumulation of a number of questions, a question to which many of the questions are similar is extracted as an appropriate question. In the operation of preparing the FAQ consisting of typical questions and answers, questions are assumed regarding items which is considered that many users have questions on. The answers are prepared manually to the questions thus prepared.

However, basically, in both of the first and second sample answer searching systems as described above, the model answers need to be prepared in advance and a large amount of labor is required for the operation of preparing the model answers. Moreover, in a case revision is partly made to a model answer to return the revised model answer to a user, the revised answer could not be appropriately managed so that it cannot be effectively utilized. Meanwhile, in the third sample answer searching system, in a case answers with similar contents were repeatedly used in the past, these answers with similar contents may possibly be retrieved limitlessly. This necessitates the work of extracting an effective sample answer from the search result in order to return an appropriate answer to a user, and in addition, this work becomes more difficult as the number of retrieved sample answers increases more.

Furthermore, in the conventional FAQ preparing method described above, all the preparing operations are manually performed so that work burden on operators (or agents) in the support center is very heavy. Moreover, judgment whether or not a certain question is to be selected as FAQ is dependent on subjective judgment of the individual operators (or agents) so that there exists difference among questions which are extracted as the FAQ by the individual operators (or agents).

Incidentally, as a method of analyzing information such as an enormous number of documents, a cluster analysis is well known. It can be expected that a clue to solve, for example, the problem in the third sample answer searching system described above and the problem in the conventional FAQ preparing technique can be obtained when the cluster analysis method is applied to the accumulation of the sample answers to divide the set of the sample answers into clusters.

However, in a hierarchical cluster analysis method generally used, very long processing time is needed for the operation of classifying an enormous number of the sample answers to the clusters. On the other hand, classification itself of an enormous number of the documents into appropriate clusters respectively is what is important in the sample answer searching operation and the FAQ preparing operation. Naturally, any other information, such as information on hierarchy obtained when analyzing the accumulation of documents by the hierarchical cluster analysis, is not necessary.

Therefore, a technique for speedily classifying an enormous number of documents into non-hierarchical clusters is first required in order to solve the above-described problems.

SUMMARY OF THE INVENTION

It is an object of the present invention to provide a document clustering device for automatically dividing a set of documents into non-hierarchical clusters.

It is another object of the present invention to provide a document searching system capable of surely retrieving an effective answer from a set of documents consisting of accumulation of pairs of questions and answers.

It is still another object of the present invention to provide a FAQ preparing system for automatically preparing FAQ from a set of documents consisting of accumulation of pairs of questions and answers.

It is yet another object of the present invention to provide a technique for assembling, without any omission, all documents whose described contents are closely related to one another into one cluster when dividing an enormous number of documents into non-hierarchical clusters.

It is yet another object of the present invention to support the operation of selecting a truly effective answer to a received question by a document searching system for retrieving an effective answer from a set of documents consisting of accumulation of pairs of questions and answers, the retrieving done by making effective use of the accumulation of the questions and the answers itself.

Furthermore, it is yet another object of the present invention to reduce work burden loaded by the preparation of model answers and model questions, by directly utilizing the accumulation of questions and answers itself.

Moreover, it is yet another object of the present invention to enable new questions and answers, which are existing answers revised, to be utilized in subsequent searches by adding them to accumulation of questions and answers every time they appear.

Still more, it is yet another object of the present invention to present an index for selecting a truly effective answer by reflecting the frequencies at which the retrieved answers have been used, upon the order of presenting retrieved answers.

It is yet another object of the present invention to enable FAQ to be automatically prepared so that operators (or agents) are freed from complicated and monotonous work of extracting typical documents as FAQs from an enormous number of documents which are extremely similar to one another, and so that operation efficiency in a support center and the like is improved.

Moreover, it is yet another object of the present invention to provide a technique for preparing highly useful FAQs by detecting with high accuracy the most typical document from a number of documents which are similar to one another.

The above-described objects are achieved by a document clustering device comprising a similarity evaluating unit for evaluating similarity between each of the documents and all the documents including the document itself, and a clustering unit for dividing the documents into non-hierarchical clusters according to evaluation results obtained by the similarity evaluation unit.

In the document clustering device as described above, each of the documents is classified according to the evaluation result by the similarity evaluating unit so that the non-hierarchical clusters, each of which includes documents similar to one another, can be made.

The above-described objects are also achieved by a document searching system comprising a storage unit for storing questions and answers to the questions, a similarity evaluating unit for evaluating similarity between each of the answers and all the answers including the answer itself, a clustering unit for dividing the answers into non-hierarchical clusters according to evaluation results obtained by the similarity evaluating unit, an association unit for associating the questions with the clusters to which their corresponding answers belong, respectively; a searching unit for searching for candidate questions highly similar to a newly inputted question according to similarity between a newly inputted question and each of the stored questions; a sampling unit for extracting one candidate for each cluster from the candidate questions highly similar to the newly inputted question, and a result output unit for outputting an answer corresponding to the candidate extracted by the sampling unit as a search result.

In the document searching system as described above, when an appropriate answer is searched through the answers stored in the storage unit, documents highly similar to the retrieved answer are excluded from the search result so that various answers can be presented at once.

The above-described objects are also achieved by a FAQ preparing system comprising a storage unit for storing questions and corresponding answers, a similarity evaluating unit for evaluating similarity between each of the answers and all the answers including the answer itself, a clustering unit for dividing the answers into non-hierarchical clusters according to evaluation results obtained by the similarity evaluating unit, a sample counting unit for calculating the number of samples included in each of the clusters, an order determining unit for ranking each of the clusters according to the number of samples included in each of the clusters, and a model extracting unit for extracting a combination of a typical answer and a typical question from answers belonging to clusters which are within a predetermined ranking and questions corresponding to these answers, respectively.

In the FAQ preparing system as structured above, the model documents are extracted from each of the clusters whose number of samples are higher among the non-hierarchical clusters each of which consists of documents similar to one another, so that FAQ can be automatically prepared from the accumulation of an enormous number of the questions and the answers.

The above-described objects are also achieved by the following structure in the document clustering device, the document searching system, or the FAQ preparing system described above. The similarity evaluating unit comprises a similarity calculating unit for calculating the similarity in each combination of all combinations of two documents selected from the documents, a candidate extracting unit for extracting candidates for documents similar to each of the documents, the extracting done according to the calculated similarity in each of the combinations, a shared document detection unit for detecting, for each combination of each of the documents and each of the corresponding candidates for the document similar to each of the documents, candidates for the documents being similar to and shared by both of the documents in this combination, and high similarity judging unit for judging whether or not the documents in this combination are highly similar to each other, according to an appropriate index regarding the detected shared document.

And, the clustering unit comprises a collecting unit for collecting an identifier which specifies a document highly similar to each of the documents according to the judgment result obtained by the high similarity judging unit, a cluster generating unit for generating a new cluster when the identifier collected satisfies a predetermined condition, and an arranging unit for arranging a document into an existing cluster, when the existing cluster includes another document indicated by the identifier collected for each of the documents.

In the document clustering device, the document searching system, or the FAQ preparing system as structured above, an index can be obtained for judging, for all the possible combinations, whether or not the two documents in each of the combinations are documents highly similar to each other whose contents are closely related to each other, the judging being done by the similarity evaluating unit. Furthermore, the use of this index enables the clustering unit to assemble the documents whose contents described are closely related to one another into the same cluster, according to simple judgment criteria, and thereby enables, to automatically divide an enormous number of documents into non-hierarchical clusters.

The above-described objects are also achieved by the structure in the document searching system, in which the result output unit comprises a score calculating unit for calculating, for each of the clusters, a score according to the number of samples included in each of the clusters, a score adjusting unit for adjusting, for each of the candidate questions which are extracted, a similarity index according to the cluster score corresponding to the cluster the candidate question is associated with, and a sorting unit for outputting answers corresponding to the candidate questions, according to the order which is determined according to the adjusted score.

In the document searching system as structured above, the answers can be presented by the result output unit, presenting answers in the order which reflects the size of the cluster to which each of the documents selected as answers belongs.

The above-described objects are also achieved by the structure in the FAQ preparing system described above in which the model extracting unit comprises a document analyzing unit for analyzing into words the answers or the questions, a document counting unit for counting, for each of the words, answers or questions which include the words, a significance evaluating unit for calculating, for each of the words, word significance according to the number of documents including each of the words, a typification evaluating unit for calculating a typification degree for each of the answers or the questions, using a predetermined function on the word significance corresponding to the words included in each of the answers or the questions, and a selecting unit for selecting a model answer and a model question for each of the clusters according to the typification degree(s).

In the FAQ preparing system as structured above, the answer or the question including more words which appear at high frequency in each of the documents belonging to each cluster can be selected and outputted as typical questions or typical answers belonging to an FAQ, by the model extracting unit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 6(a) and FIG. 6(b) are tables explaining similarity evaluating operations;

FIG. 9 is a table showing an example of a seeking table;

FIG. 11(a) and FIG. 11(b) are tables explaining cluster dividing operations;

FIG. 14(a) and FIG. 14(b) are tables explaining the operations of the document searching system;

DESCRIPTION OF THE PREFERRED EMBODIMENTS

[Principle]

The principles of a document clustering device, a document searching system, and a FAQ preparing system according to the present invention are first explained.

Figure 1:
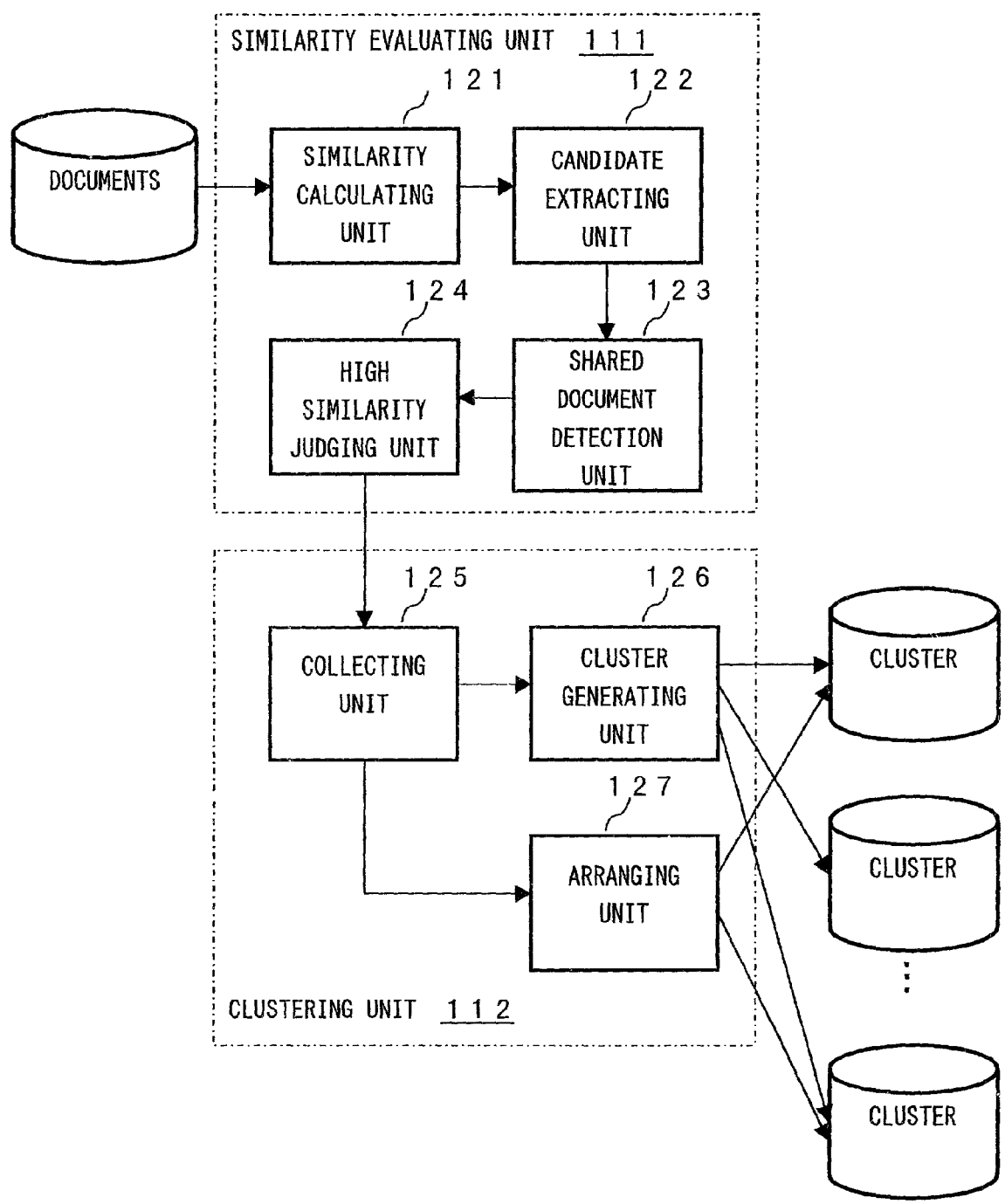
FIG. 1 is a block diagram showing the principle of a document clustering device according to the present invention.

A block diagram showing the principle of the document clustering device according to the present invention is shown in FIG. 1.

The document clustering device shown in FIG. 1 is composed of a similarity evaluating unit 111 and a clustering unit 112.

The principle of the document clustering device according to the present invention is described as follows.

The similarity evaluating unit 111 evaluates similarity between each of the documents and all of the documents including the document itself. The clustering unit 112 divides the documents into non-hierarchical clusters according to evaluation results obtained by the similarity evaluating unit 111.

The operation of the document clustering device as structured above is described as follows.

The clustering unit 112 classifies each of the documents into an appropriate cluster according to the evaluation results obtained by the similarity evaluating unit 111.

Figure 2:
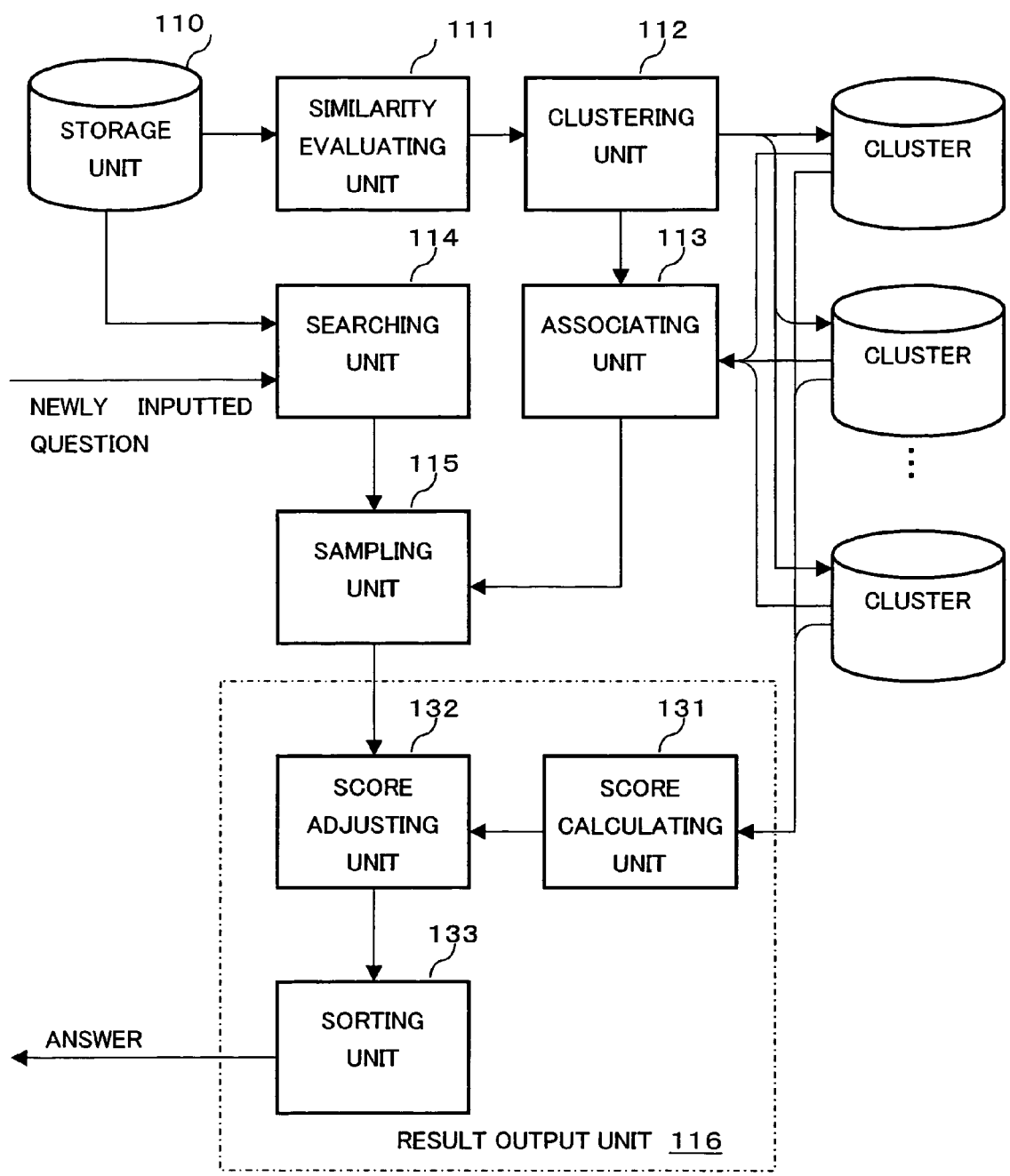
FIG. 2 is a block diagram showing the principle of a document searching system according to the present invention.

A block diagram of the principle of the document searching system according to the present invention is shown in FIG. 2.

The document searching system shown in FIG. 2 is composed of a storage unit 110, the similarity evaluating unit 111, the clustering unit 112, an association unit 113, a searching unit 114, a sampling unit 115, and a result output unit 116.

The principle of the document searching system according to the present invention is described as follows.

The storage unit 110 stores questions and documents used as the corresponding answers to these questions. The similarity evaluating unit 111 evaluates similarity between each of the documents and all of the documents including the document itself. The clustering unit 112 divides the documents into non-hierarchical clusters according to evaluation results obtained by the similarity evaluating unit 111. The association unit 113 associates the questions with clusters to which the documents corresponding to the questions belong, respectively. The searching unit 114 searches for candidate questions highly similar to a newly inputted question according to similarity between the newly inputted question and each of the questions. The sampling unit 115 extracts one candidate from each cluster, by excluding candidate(s) other than the extracted candidate which is/are associated with a cluster with which the extracted candidate is associated, from the candidates questions highly similar to the newly inputted question. The result output unit 116 outputs documents which are stored in the storage unit 110, corresponding to the candidate extracted by the sampling unit as a search result.

The operation of the document searching system as structured above is described as follows.

The similarity between the documents stored in the storage unit 110 is first evaluated for all the possible combinations by the similarity evaluating unit 111 and each of the documents is classified in an appropriate cluster by the clustering unit 112 according to the evaluation results. Thereby, the non-hierarchical clusters each of which consists of the documents similar to one another are generated and each question stored in the storage unit 110 is associated with one of these clusters by the association unit 113. Thereafter, in response to the input of a new question, the sampling unit 115 extracts one candidate for each of the clusters from the candidate questions highly similar to a newly inputted question which are retrieved from the storage unit 110 by the searching unit 114 and the candidates are presented via the result output unit 116.

Figure 3:
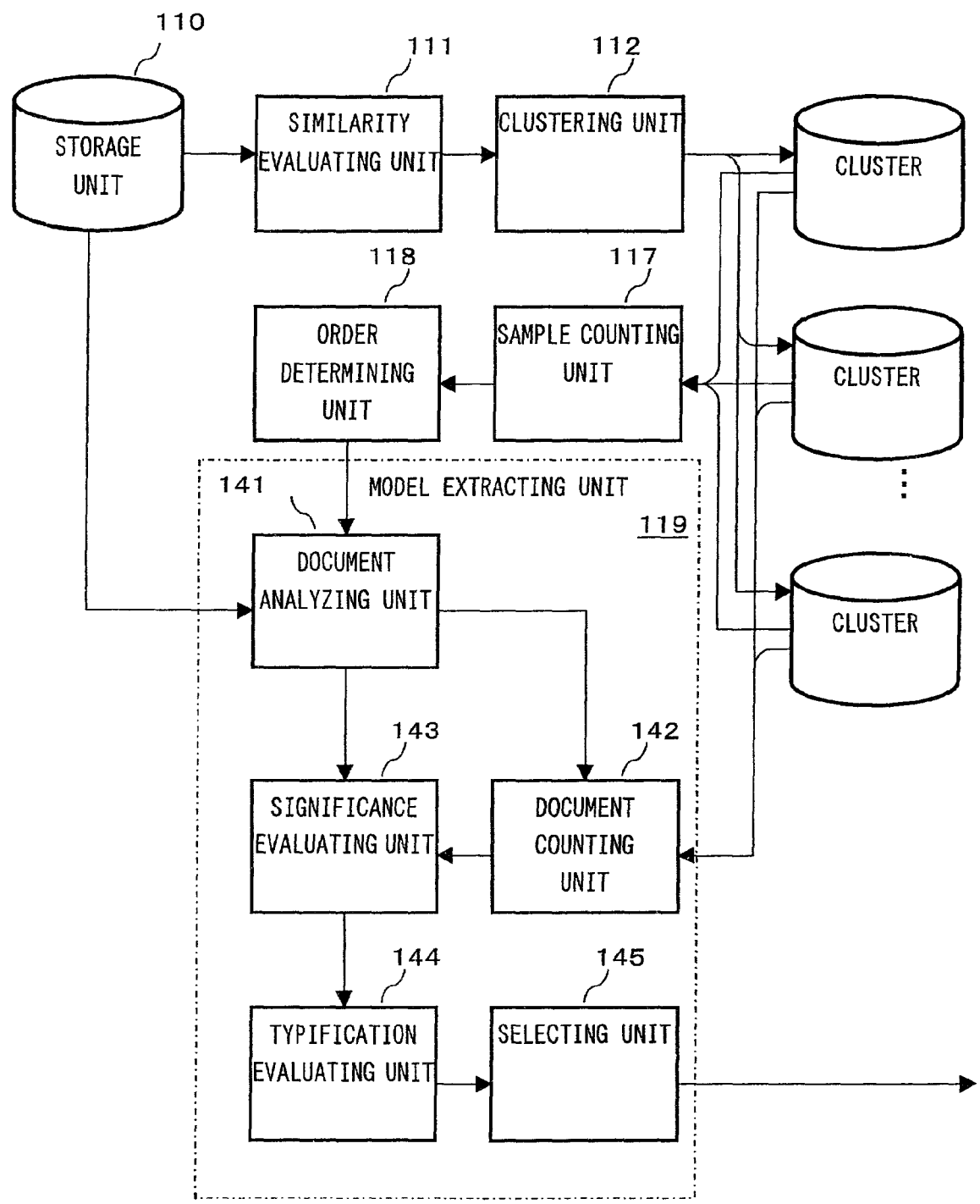
FIG. 3 is a block diagram showing the principle of a FAQ preparing system according the present invention.

A block diagram showing the principle of the FAQ preparing system according to claim 3 is shown in FIG. 3.

The FAQ preparing system shown in FIG. 3 is composed of the storage unit 110, the similarity evaluating unit 111, the clustering unit 112, a sample counting unit 117, an order determining unit 118, and a model extracting unit 119.

The principle of the FAQ preparing system according to the present invention is described as follows.

The storage unit 110 stores questions and documents used as the corresponding answers to these questions. The similarity evaluating unit 111 evaluates similarity between each of the documents and all of the documents including the document itself. The clustering unit 112 divides the documents into non-hierarchical clusters according to evaluation results obtained by the similarity evaluating unit 111. The sample counting unit 117 calculates the number of samples included in each of the clusters. The order determining unit 118 ranks each of the clusters according to the number of samples included in each of the clusters. The model extracting unit 119 extracts a combination of a typical answer and a typical question from documents belonging to the clusters which are within a predetermined ranking and questions corresponding to these documents, respectively, and outputs the combination as FAQ.

The operation of the FAQ preparing system as structured above is described as follows.

The similarity evaluating unit 111 evaluates the similarity between the documents stored in the storage unit 110 for all the possible combinations, and the clustering unit 112 classifies each of the documents in an appropriate cluster according to the evaluation results so that the non-hierarchical clusters consisting of documents similar to one another are generated. Thereafter, the model extracting unit 119 extracts the model documents from the clusters which ranks higher by the order determining unit 118 according to the number of their samples calculated by the sample counting unit 117.

The similarity evaluating unit 111 shown in FIG. 1 is composed of a similarity calculating unit 121, a candidate extracting unit 122, a shared document detection unit 123, and a high similarity judging unit 124 while the clustering unit 112 is composed of a collecting unit 125, a cluster generating unit 126, and an arranging unit 127.

The principle of the similarity evaluating unit and the clustering unit according to the present invention is described as follows.

In the similarity evaluating unit 111, the similarity calculating unit 121 calculates similarity between each combination of all combinations of two documents selected from the documents. The candidate extracting unit 122 extracts candidates for documents similar to each of the documents, in which the extracting is done according to the similarity in each of the combinations. The shared document detection unit 123 detects, for each of the combinations of each of the documents and each of the candidates for the document similar to each of the documents, candidates for the documents which is similar to and shared by both of the documents in this combination. According to an appropriate index regarding the detected shared document, the high similarity judging unit 124 judges, for each combination of each of the documents and each of the candidates for the document similar to each of the documents, whether or not the documents in this combination are highly similar to each other, and outputs the judgment result as an evaluation result. The collecting unit 125 in the clustering unit 112 collects an identifier specifying a document highly similar to each of the documents according to the judgment result obtained by the high similarity judging unit 124. The cluster generating unit 126 generates a new cluster when the identifier collected for each of the documents satisfies a predetermined condition. The arranging unit 127 arranges a concerning document, among the documents, into an existing cluster, when the existing cluster includes another document indicated by the identifier which is collected for each of the documents.

The operations of the similarity evaluating unit and the clustering unit as structured above are described as follows.

In the similarity evaluating unit 111, the candidates for the similar document are extracted for each of the documents by the candidate extracting unit 122 according to the similarity calculated by the similarity calculating unit 121. The shared document detection unit 123 detects, for the combination of each of the concerning documents and each of the extracted candidate for the similar document corresponding to the concerning document, all candidates for the similar document which is shared by the two documents in this combination. The high similarity judging unit 124 judges, according to this detection result, whether or not the documents included in each of the combinations are highly similar documents whose contents are closely related to each other. Meanwhile, in the clustering unit 112, the collecting unit 125 collects the identifier indicating the highly similar document for each of the documents, and according to this result, the cluster generating unit 126 generates a new cluster, for example, for a document which is judged not to have any highly similar document or a document which nor whose highly similar document is included in the existing document clusters. Meanwhile, each of the other documents are arranged into the clusters including their corresponding highly similar documents by the arranging unit 127.

The result output unit 116 in the document searching system shown in FIG. 2 is composed of a score calculating unit 131, a score adjusting unit 132, and a sorting unit 133.

The principle of the result output unit according to the present invention is described as follows.

The score calculating unit 131 in the result output unit 116 calculates a score as a cluster score for each of the clusters according to the number of samples included in each of the clusters. The score adjusting unit 132 adjusts, for each of the candidate questions which are extracted by the sampling unit 115, a similarity index obtained in the searching unit 114, according to the cluster score corresponding to the cluster with which the candidate is associated. The sorting unit 133 rearranges the candidate questions according to the adjusted scores and outputs answers corresponding to the candidate questions as a search result.

The operation of the result output unit as structured above is described as follows.

The score adjusting unit 132 in the result output unit 116 adjusts the similarity indexes indicating the similarity which is used in searching for the candidate questions, according to the cluster scores calculated by the score calculating unit 131. The sorting unit 133 rearranges the candidate questions according to the adjusted similarity indexes.

The model extracting unit 119 in the FAQ preparing system shown in FIG. 3 is composed of a document analyzing unit 141, a document counting unit 142, a significance evaluating unit 143, a typification evaluating unit 144, and a selecting unit 145.

The principle of the model extracting unit according to the present invention is described as follows.

The document analyzing unit 141 in the model extracting unit 119 analyzes into words the documents belonging to each of the clusters or the questions corresponding to these documents. The document counting unit 142 counts, for each of the words, documents or questions including the words. The significance evaluating unit 143 calculates, for each of the words, word significance according to the number of the documents including each of the words. The typification evaluating unit 144 calculates a typification degree for each of the documents or the questions, by using a predetermined function on the word significance corresponding to the words included in each of the documents or the questions. The selecting unit 145 selects, for each of the clusters, a document and a question which are to be a model document and a model question, according to the typification degree(s).

The operation of the model extracting unit as structured above is described as follows.

The document counting unit 142 in the model extracting unit 119 counts, for each of the words which are obtained by the document analyzing unit 141, the documents or the questions including each of the concerning words. According to this counting result, the significance evaluating unit 143 calculates, for each of the words, the word significance according to frequency of occurrence in the documents included in each of the concerning clusters or the questions corresponding to them. According to the word significance thus obtained, the typification evaluating unit 144 calculates the typification degrees, and furthermore, according to the typification degrees, the selecting unit 145 selects the document and the question which are to be the model document and the model question.

Embodiments

Embodiments of the present invention are explained in detail below with reference to the drawings.

Figure 4:
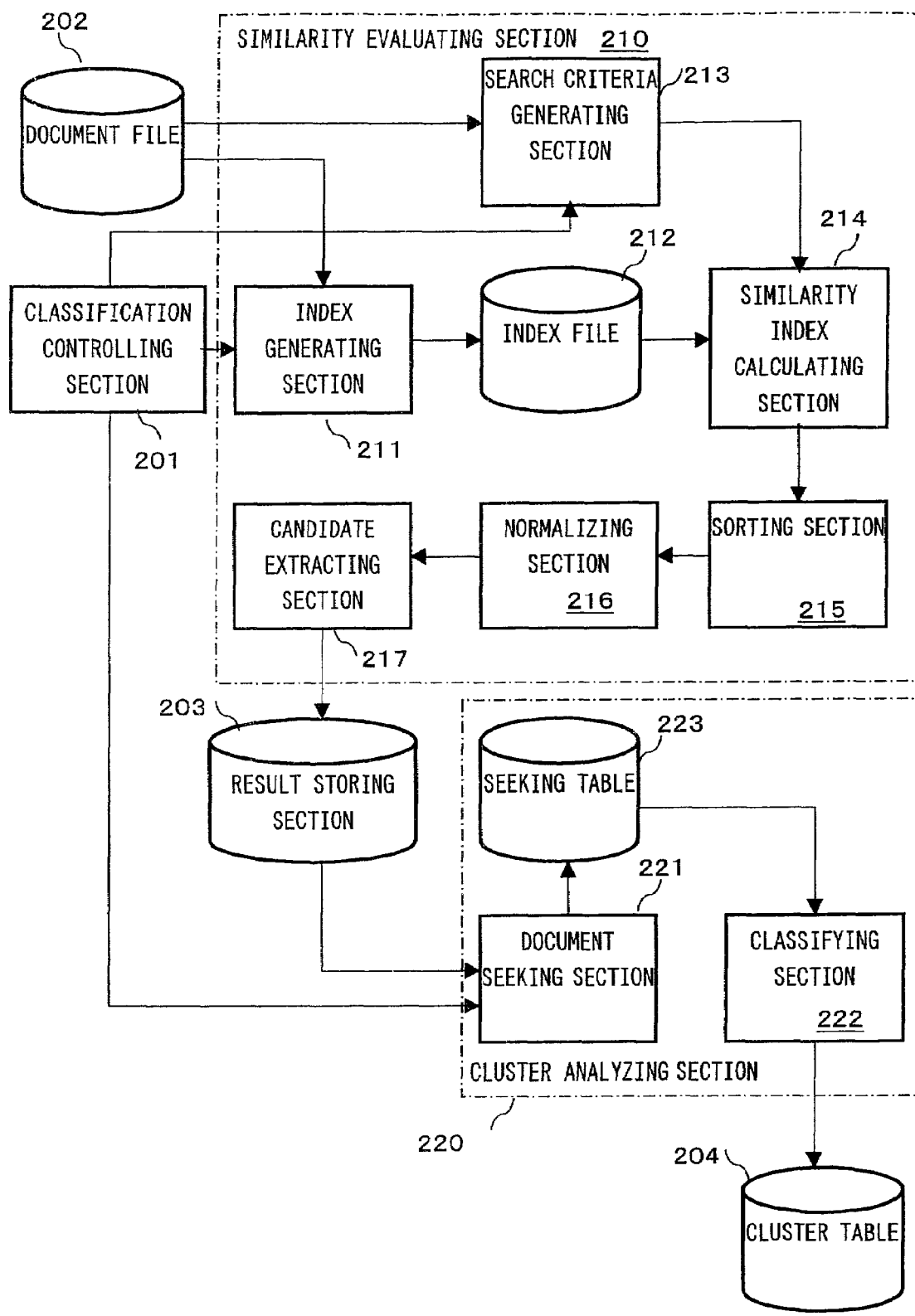
FIG. 4 is a block diagram showing an embodiment of the document clustering device according to the present invention.

An embodiment of the document clustering device according to the present invention is shown in FIG. 4.

In the document clustering device shown in FIG. 4, a similarity evaluating section 210 evaluates similarity between documents stored in a document file 202 in response to an instruction from a classification controlling section 201 and stores the evaluation results in a result storing section 203. Furthermore, in FIG. 4, a cluster analyzing section 220, in response to the instruction from the classification controlling section 201, classifies the documents stored in the document file 202 into clusters according to the evaluation results stored in the result storing section 203 and stores the result in a cluster table 204.

In the similarity evaluating section 210 shown in FIG. 4, an index generating section 211 analyzes each of the documents stored in the document file 202 in response to the instruction from the classification controlling section 201 to prepare an index list on words included in each of the documents and stores the index lists in an index file 212. Meanwhile, a search criteria generating section 213, a similarity index calculating section 214, a sorting section 215, and a normalizing section 216 in the similarity evaluating section 210 shown in FIG. 4 utilize the above-mentioned index file 212 to obtain an index for judging the similarity between the documents stored in the document file 202. Furthermore, according to this index, a candidate extracting section 217 in FIG. 4 extracts, for each of the documents, similar documents as candidates for a highly similar document which is described later and stores the extracted similar documents in the result storing section 203.

Meanwhile, in the cluster analyzing section 220 shown in FIG. 4, a document seeking section 221, following the instruction from the classification controlling section 201, searches for the document most highly similar to each of the documents from the similar documents which are stored for each of the documents in the result storing section 203 and stores this search result in a seeking table 223. According to this search result, a classifying section 222 assembles documents similar to one another in one cluster to generate the clusters and stores the classification result in the cluster table 204.

Here, how each of the sections shown in FIG. 4 corresponds to each of the units shown in FIG. 1 is explained.

The similarity calculating unit 121 shown in FIG. 1 corresponds to the index generating section 211, the index file 212, the search criteria generating section 213, and the similarity index calculating section 214 shown in FIG. 4. The candidate extracting unit 122 shown in FIG. 1 corresponds to the sorting section 215, the normalizing section 216, and the candidate extracting section 217 shown in FIG. 4. Meanwhile, the functions of the high similarity judging unit 124 and the collecting unit 125 shown in FIG. 1 are achieved by the document seeking section 221 shown in FIG. 4 retrieving the highly similar document from the result storing section 203, according to the instruction from the classification controlling section 201. Furthermore, the functions of the cluster generating unit 126 and the arranging unit 127 shown in FIG. 1 are achieved by the classifying section 222 shown in FIG. 4.

The operation of the document clustering device is explained next.

Figure 5:
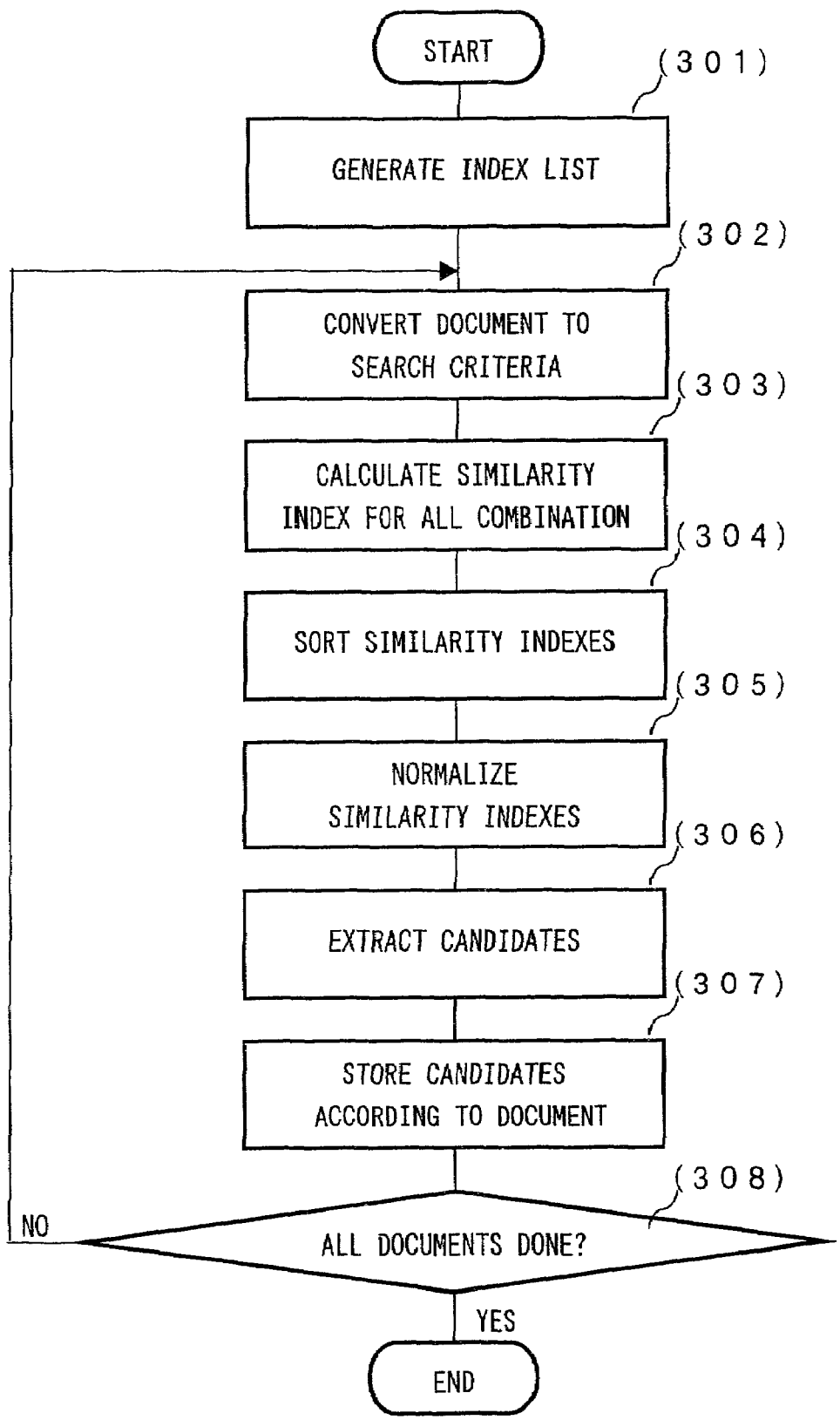
FIG. 5 is a flow chart showing the operation of a similarity evaluating section.

A flow chart showing the operation of the similarity evaluating section is shown in FIG. 5. Furthermore, tables showing similarity evaluating operations are shown in FIG. 6.

First, the index generating section 211 generates an index list on all the documents stored in the document file 202, following the instruction from the classification controlling section 201 (Step 301). At this time, the index generating section 211 generates the index list, for example, using a method as introduced in "Managing Gigabyte" (Ian H. Witten, Alistair Moffat, Timothy C. Bell 1994 Van Norstrand Reinhold New York) and so on. Furthermore, at this time, the index generating section 211 also collects information necessary for searching for the document similar to a particular document, such as frequency of each of the words occurring in each of the documents. Thereby, in the index file 212 shown in FIG. 4, the index which stores identifier (hereinafter referred to as a document ID), which indicates documents including each of the words, is stored according to each word, and information such as the frequency of occurrence of each of the words, is also stored according to each document ID, as shown in FIG. 6(a).

Meanwhile, the search criteria generating section 213 shown in FIG. 4 reads a document to be processed according to the instruction from the classification controlling section 201 and converts this document to search criteria according to a predetermined form (Step 302 in FIG. 5). At this time, this operation can be achieved, for example, when the search criteria generating section 213 extracts words included in the document (word1 □□□ wordn) and connects combinations of these words (word1 □□□ wordn) and respective frequencies of occurrence (frq1 □□□ frqn) with each other by an operator 'or' as is shown in Formula (1) to generate the search criteria Q for searching for a document including at least one word among these words from the stored documents.

Q=word1frq1 or word2frq2 or . . . or wordn frqn    Formula (1)

Next, the similarity index calculating section 214 shown in FIG. 4, using the above-described index file 212, calculates a similarity index between each of the documents including at least one of the words shown in the search criteria and the document to be processed (Step 303 in FIG. 5). The similarity index calculating section 214 calculates a similarity index $R_{ix}$ between a document to be processed indicated by a document $id_i$ and each of the documents indicated by a document $id_x$, for example, according to the number of words which commonly appear in these documents, frequencies of occurrence of these words, and so on. The combination of the similarity index $R_{ix}$ thus calculated and the document $id_x$ indicating each of the documents is inputted to the sorting section 215.

Next, the sorting section 215 shown in FIG. 4 performs sorting processing of sorting the similarity indexes between the document to be processed and the respective documents, which are calculated by the above similarity index calculating section 214, according to their values (Step 304 in FIG. 5). The normalizing section 216 then normalizes the above-mentioned similarity indexes $R_{ix}$ between the document to be processed and the respective documents by using its maximum value Rm to obtain an assembly of normalized similarity indexes $S_{ix}$ (Step 305 in FIG. 5).

The candidate extracting section 217 shown in FIG. 4 extracts samples whose values are equal to or greater than a predetermined threshold value from the set of thus normalized similarity indexes $S_{ix}$ (Step 306 in FIG. 5). Combinations of the similarity indexes $S_{ix}$ which are extracted by the candidate extracting section 217 and the document IDs corresponding to each of the similarity indexes $S_{ix}$ are stored in the result storing section 203 to correspond to the document ID indicating the document under processing (Step 307). Thereafter, the classification controlling section 201 judges whether or not the processing for all the documents is completed (Step 308). In a case this judgment in Step 308 is negative, the processing returns to Step 302 and an instruction to the effect that a subsequent document should be converted to the search criteria is given to the search criteria generating section 213 and the processing for this document is started.

In this way, each of the documents stored in the document file 202 is processed by the similarity evaluating section 210 so that documents with similarity indexes in a higher range are extracted for each of the documents as candidates for a highly similar document described later. As a result of the above processing, a set consisting of combinations of document IDs which indicate the documents whose similarity indexes to the document under processing is in a higher range and corresponding similarity indexes is stored for each of the documents in the result storing section 203 as a similarity evaluation result for the document (FIG. 6(b)).

Then, when the processing for all the documents is completed, the classification controlling section 201 finishes the processing by the similarity evaluating section 210 as positive judgment in the aforesaid Step 308 and activates the operation of the cluster analyzing section 220.

Figure 7:
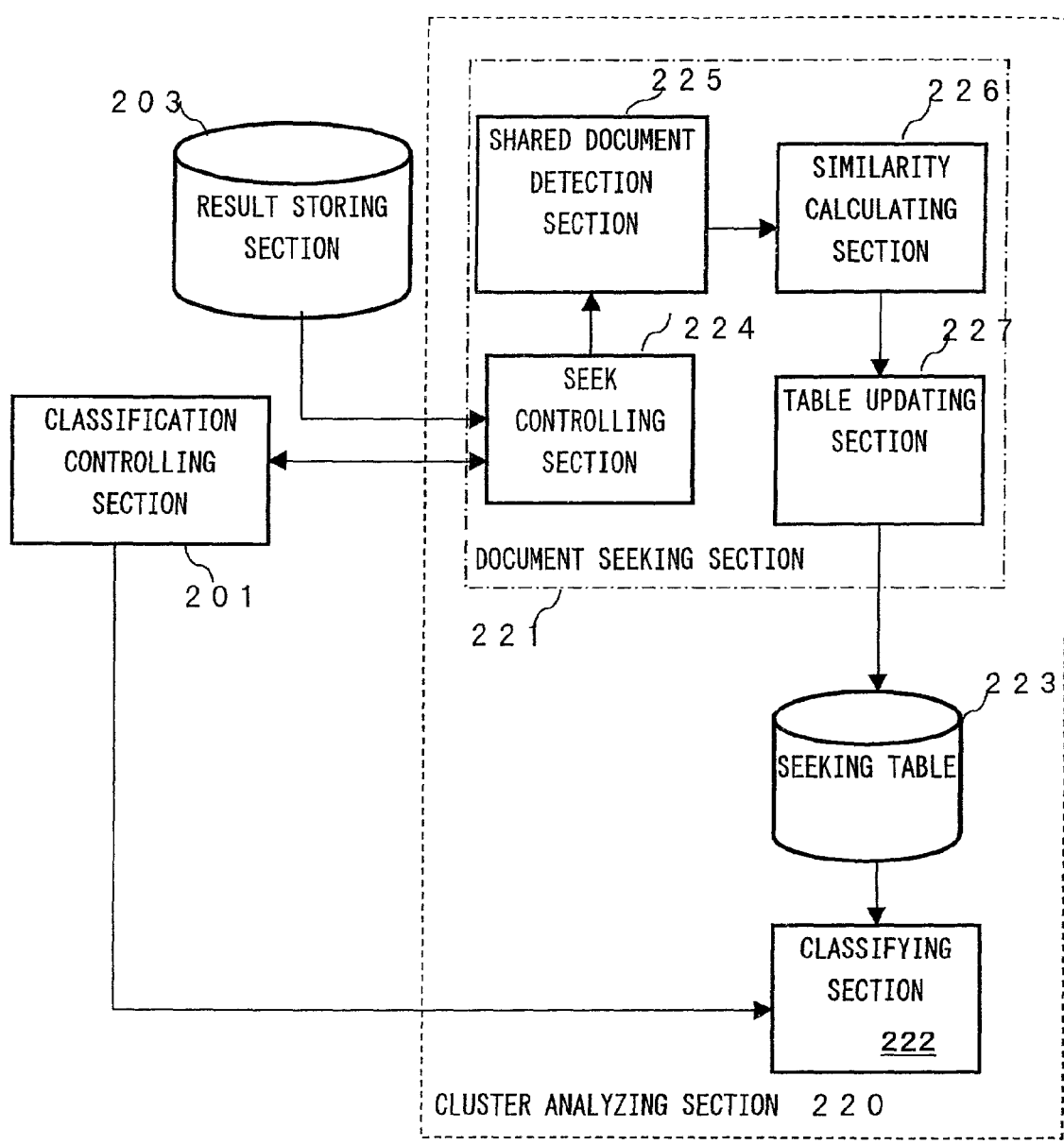
FIG. 7 is a block diagram showing the structure of a document seeking section in detail.
Figure 8:
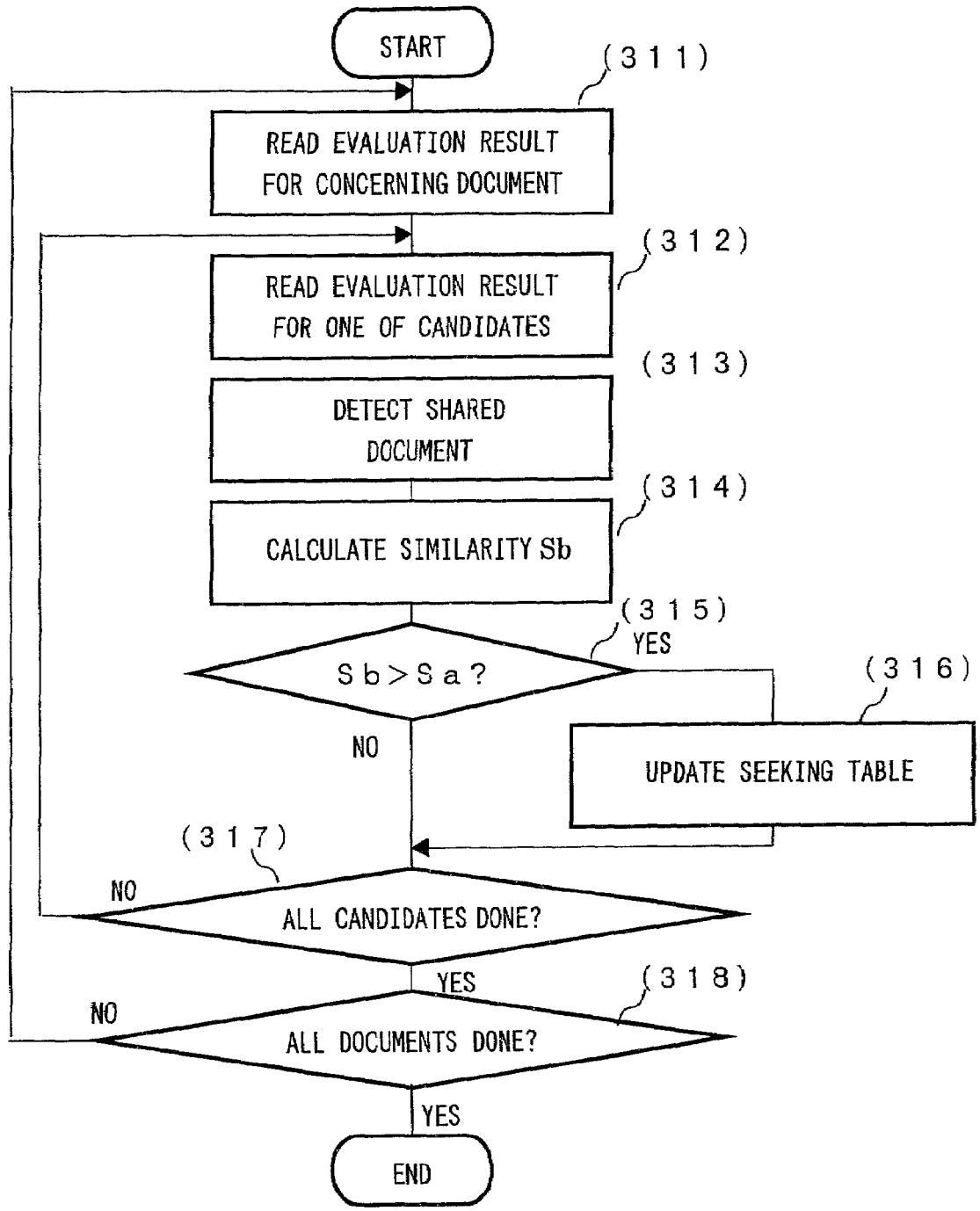
FIG. 8 is a flow chart showing a document seeking operation.

The structure of the document seeking section 221 is shown in detail in FIG. 7. Furthermore, a flow chart showing the searching operation for the highly similar document is shown in FIG. 8.

In the document seeking section 221 shown in FIG. 7, a seek controlling section 224 reads the evaluation result corresponding to a document designated as a concerning document from the result storing section 203 according to the instruction from the classification controlling section 201 (Step 311 in FIG. 8), and according to this evaluation result, the seek controlling section 224 instructs appropriate processing to a shared document detection section 225, a similarity calculating section 226, and a table updating section 227 respectively to execute the processing in the following Step 312 to Step 316.

The seek controlling section 224 subsequently selects one document as a document to be subjected from the set of the similar documents indicated by the document IDs which are included in the aforesaid evaluation result and reads the evaluation result, which is stored in the result storing section 203, corresponding to this document to be subjected (Step 312). Then, the evaluation result which is read here is given to the shared document detection section 225 together with the evaluation result corresponding to the aforesaid concerning document. The shared document detection section 225 compares two assemblies of the document IDs included in these evaluation results with each other and detects, as shared documents, all documents indicated by document IDs which are commonly included in these two assemblies (Step 313). The similarity calculating section 226 calculates similarity between the concerning document and the document to be subjected according to similarity indexes between each of the shared documents which are detected in the manner described above and the concerning document and according to the number of the shared documents (Step 314). At this time, this operation can be achieved, for example, when the similarity calculating section 226 calculates similarity $S_b$ between a concerning document IDx and a document to be subjected IDy, using Formula (2) which is expressed by using a similarity index $S_{xy}$ (i) corresponding to an ith shared document $ID_{xy}$ (i) which is detected in the manner described above and the number of shared documents k, and gives the similarity $S_b$ to the table updating section 227.

$$Sb = \frac{\sum_{i=1}^{k} S_{xy}(i)}{k} * \sqrt{k} \qquad \text{Formula (2)}$$

The table updating section 227 compares a reference value $S_a$ for the similarity, which is stored in the seeking table 223, corresponding to the concerning document with the similarity $S_b$ which is calculated in the above Step 314 (Step 315), and when the similarity $S_b$ exceeds the reference value $S_a$, it proceeds to Step 316 to update the seeking table 223.

Here, the seeking table 223 has storage areas for storing therein, for example, the similarity reference value $S_a$ and the document ID of the highly similar document corresponding to each of the document IDs, and when a highly similar document searching operation is started, a numerical value '0' has been stored as the similarity reference value $S_a$ corresponding to each of the document IDs. Furthermore, in Step 316, the table updating section 227 updates the reference value $S_a$ for the similarity corresponding to the concerning document by the similarity Sb which is calculated in Step 314 and stores the document ID indicating the document to be subjected as information indicating the highly similar document.

In this way, after the updating of the seeking table 223 is finished and in a case negative judgment is obtained in the above Step 315, the seek controlling section 224 judges whether or not the evaluation of all the candidates for the highly similar document, which are shown in the evaluation result corresponding to the concerning document, is completed (Step 317), and when negative judgment is obtained, the seek controlling section 224 returns to Step 312 to start evaluating a subsequent candidate for the highly similar document.

As described above, the similarities between the concerning document and each of all the documents indicated by the evaluation result corresponding to the concerning document is calculated according to the similarity index of each of the shared documents, and according to this similarity, the seeking table 223 is updated. This makes it possible to detect the highly similar document from the documents similar to the concerning document. For example, when the seeking processing described above is executed according to the evaluation result shown in FIG. 6(b), the highly similar document, which has the highest degree of similarity in what is described in comparison with the concerning document, corresponding to each of the documents can be obtained, as shown in FIG. 9.

When the evaluation of all the candidates for the highly similar document is finished in this way, the seek controlling section 224 notifies the classification controlling section 201 as positive judgment in Step 317 that the seeking processing for the concerning document is completed. According to this notification, the classification controlling section 201 judges whether or not the concerning document is the last document (Step 318), and in a case the result of the judgment is negative, it instructs that the seeking processing should be started from Step 311 with a subsequent document as a concerning document. According to this instruction, the document seeking section 221 starts processing the new concerning document. Thereafter, when the seeking process for all the concerning documents is finished, the classification controlling section 201 finishes the processing of seeking the highly similar document as positive judgment in Step 318 and instructs the classifying section 222 to start the operation of dividing the documents into clusters.

Figure 10:
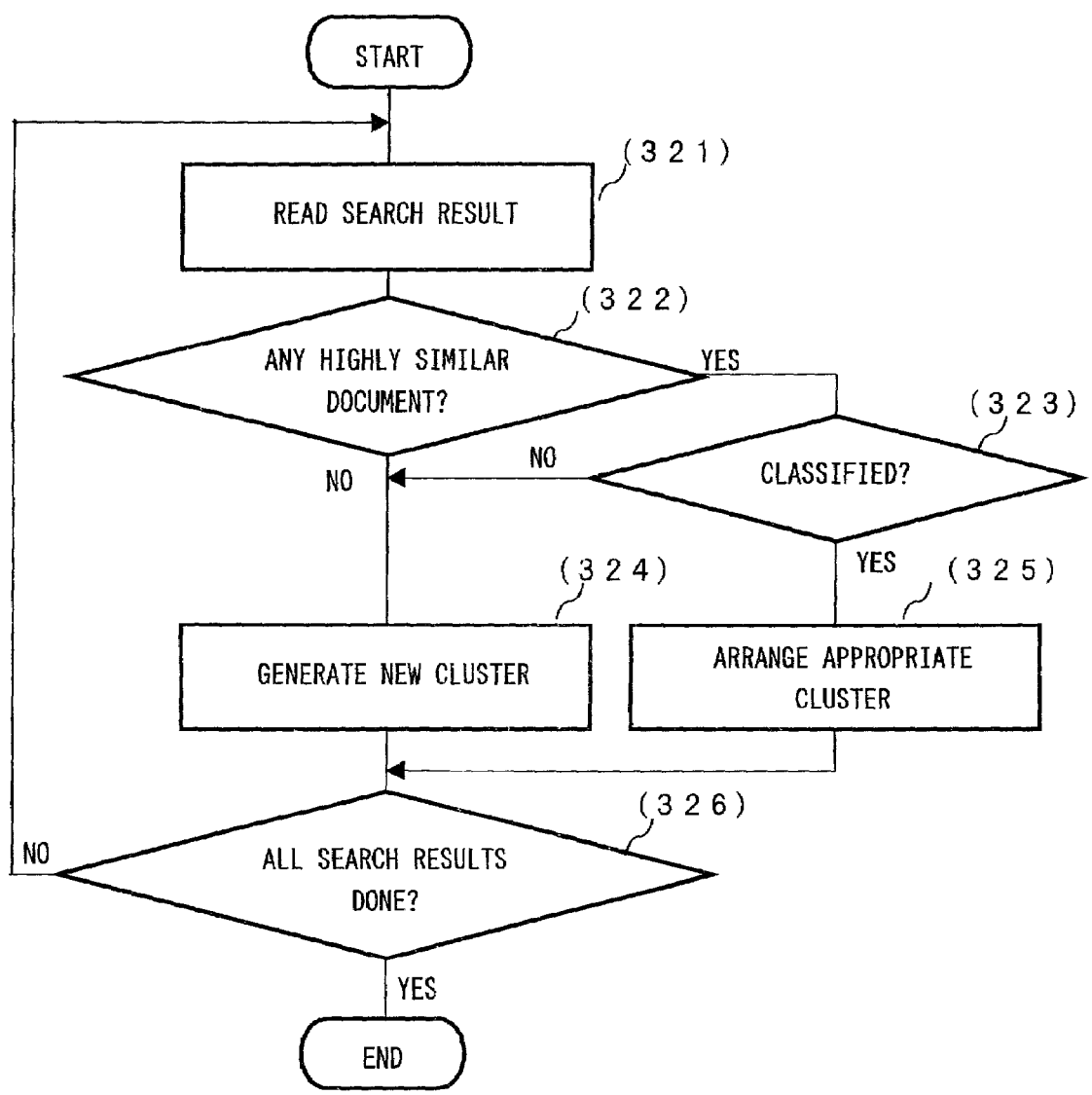
FIG. 10 is a flow chart showing the operation of dividing an accumulation of documents into clusters.

A flow chart showing the operation of dividing the documents into the clusters is shown in FIG. 10.

The classifying section 222 reads the search result, which is stored in the seeking table 223, corresponding to a designated document ID (Step 321), following the instruction from the classification controlling section 201. In a case a document ID indicating its highly similar document is shown as the search result, which signifies positive judgment in Step 322, processing in Step 323 is executed to judge whether or not this highly similar document is classified in either of the existing clusters.

As an example, explanation is given on a case when the first search result in the seeking table 223 shown in FIG. 9, namely, the search result corresponding to the document indicated by a document id1 is a concerning document for processing. A document id2 is stored as a highly similar document corresponding to the document id1 in the seeking table 223, which results in positive judgment in the aforesaid Step 322. However, this document id2 has not been classified yet, which results in negative judgment in Step 323. In this case, the classifying section 222 assembles the document id1 as a concerning document and the document id2 as the highly similar document corresponding to the document id1 into a new cluster (Step 324). At this time, the classifying section 222 gives a cluster ID to the new cluster and stores in the cluster table 204 document IDs indicating the documents to be samples in the cluster and the number of samples to correspond to this cluster ID, as shown in FIG. 11(a).

Meanwhile, for example, in a case the search results shown in FIG. 9 are read to be processed in sequence, the highly similar document id2 shown in the search result corresponding to a document id4 has already been classified in a cluster ID1, which results in positive judgment in Step 323. In this case, the classifying section 222 arranges the document id4 into a corresponding cluster, namely, a cluster indicated by the cluster ID1 including the highly similar document id2 (Step 325) and adds the document id4 as a sample to be stored in the cluster table 204 corresponding to the cluster ID1 while incrementing the number of samples as shown in FIG. 11(b).

Meanwhile, in a case the search results referred to in Step 321 do not include any highly similar document, the classifying section 222, as negative judgment in Step 322, proceeds to Step 324 to generate a new cluster consisting of only the concerning document.

After the processing in Step 324 or Step 325 described above is finished, the classification controlling section 201 judges whether or not the processing for all the search results is completed (Step 326). In a case the result of this judgment in step 326 is negative, the classification controlling section 201 instructs the classifying section 222 to return to Step 321 and start processing a subsequent search result.

In this way, when the processing for all the search results is completed, the classification controlling section 201 finishes the processing of clustering, as positive judgment in Step 326.

As described above, the highly similar document obtained for each of the documents is considered to be a document whose described content is the most related to the concerning document. Therefore, assembling the concerning document and its highly similar document into one cluster in the processing in Step 322 to Step 325 makes it possible to automatically divide an enormous number of documents into non-hierarchical clusters.

Here, the calculation of the similarity index which is used as an index for evaluating similarity in described contents between two documents is processed by a simple arithmetic operation (Step 302 and Step 303) according to the number of words commonly appearing in the concerning combination of two documents and frequencies of occurrence of the words and can be executed speedily by using a generally known inverted file. Documents similar to each of the documents are obtained in advance as candidates for highly similar documents, according to this similarity index. And, according to whether or not each of the documents and each of the corresponding candidates for documents highly similar to each of the documents share many documents with high similarity, it is judged whether or not these two documents should be arranged in the same cluster, as described above. This is done so that the process of dividing an enormous number of documents into clusters is simplified. Therefore, in the document clustering device described above, the clustering processing is very simple compared with a conventional clustering system which generates hierarchical clusters, so that an enormous number of documents can be divided into non-hierarchical clusters far more speedily.

Next, the document searching system to which the document clustering device described above is applied is explained.

Figure 12:
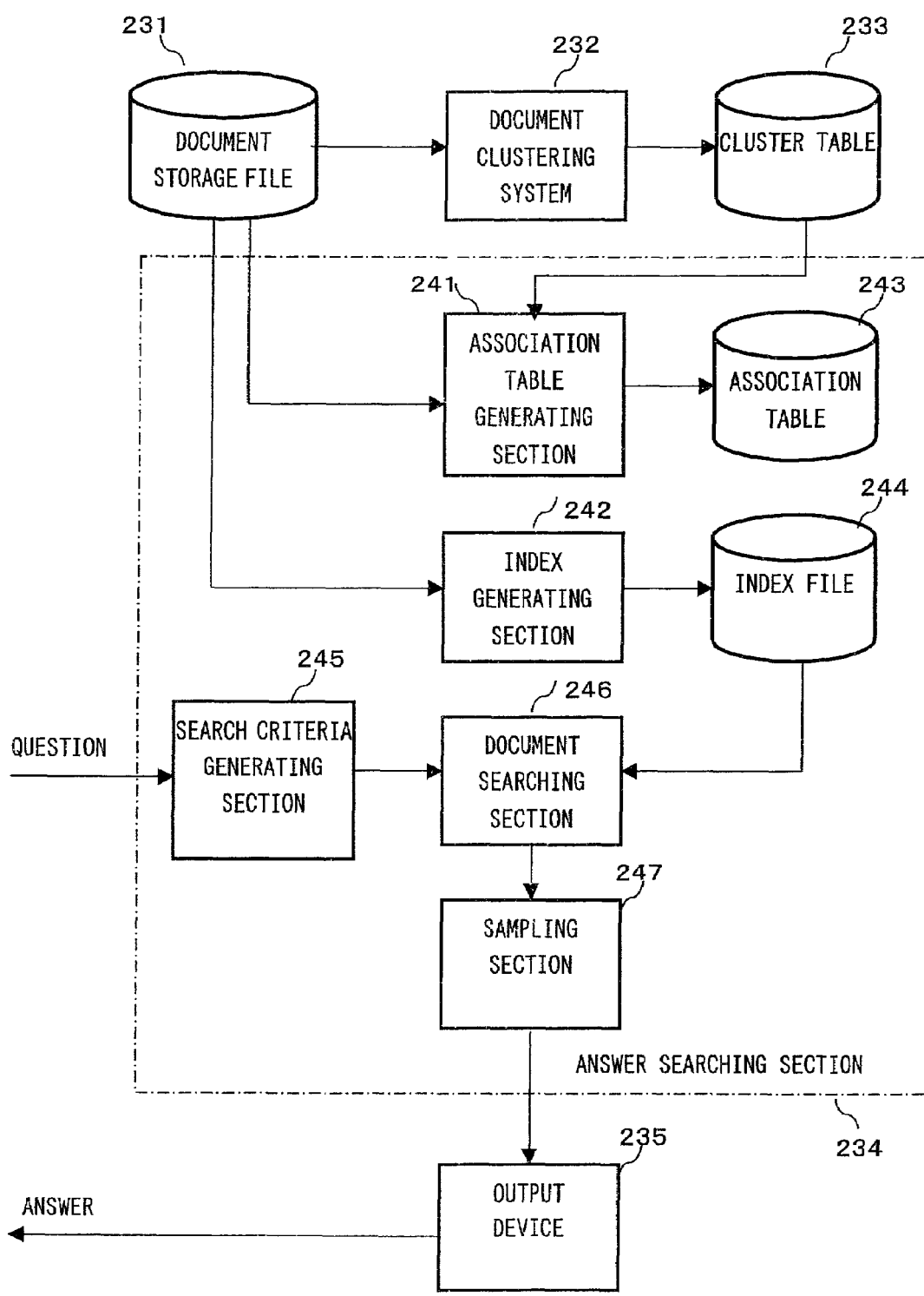
FIG. 12 is a block diagram showing an embodiment of the document searching system according to the present invention.

An embodiment of the document searching system is shown in FIG. 12.

In a document storage file 231 in the document searching system shown in FIG. 12, for example, a number of questions sent from users to a support center and the like and answers returned to these questions are stored, each of them making a pair. In FIG. 12, a document clustering device 232 divides the answers stored in the document storage file 231 into non-hierarchical clusters as described above and generates a cluster table 233. Meanwhile, an answer searching section 234 in the document searching system shown in FIG. 12 retrieves appropriate sample answers from the document storage file 231 by using the above cluster table 233 in response to an input of a new question from a user and returns the answers to the user via an output device 235.

An association table generating section 241 and an index generating section 242 in the answer searching section 234 shown in FIG. 12 execute preparatory processing for the sample questions stored in the document storage file 231 prior to sample answer search processing in order to speed up the search processing to generate an association table 243 and an index file 244 respectively.

A search criteria generating section 245 in the answer searching section 234 shown in FIG. 12 converts the newly inputted question to search criteria and gives the search criteria to a document searching section 246. The document searching section 246 searches for sample questions similar to the inputted question according to the search criteria and the aforesaid index file 244 and a sampling section 247 selects appropriate sample answers from the search result to give them to the output device 235.

Here, it is explained how each of the sections shown in FIG. 12 corresponds to each of the units shown in FIG. 2.

The document clustering device 232 shown in FIG. 12 corresponds to the similarity evaluating unit 111 and the clustering unit 112 shown in FIG. 2. The association table generating section 241 and the association table 243 shown in FIG. 12 correspond to the association unit 113 shown in FIG. 2. The index file 244, the search criteria generating section 245, and the document searching section 246 shown in FIG. 12 correspond to the searching unit 114 shown in FIG. 2. Meanwhile, the functions of the sampling unit 115 and the result output unit 116 shown in FIG. 2 are achieved by the sampling section 247.

Next, the operation of the document searching system is explained.

Figure 13:
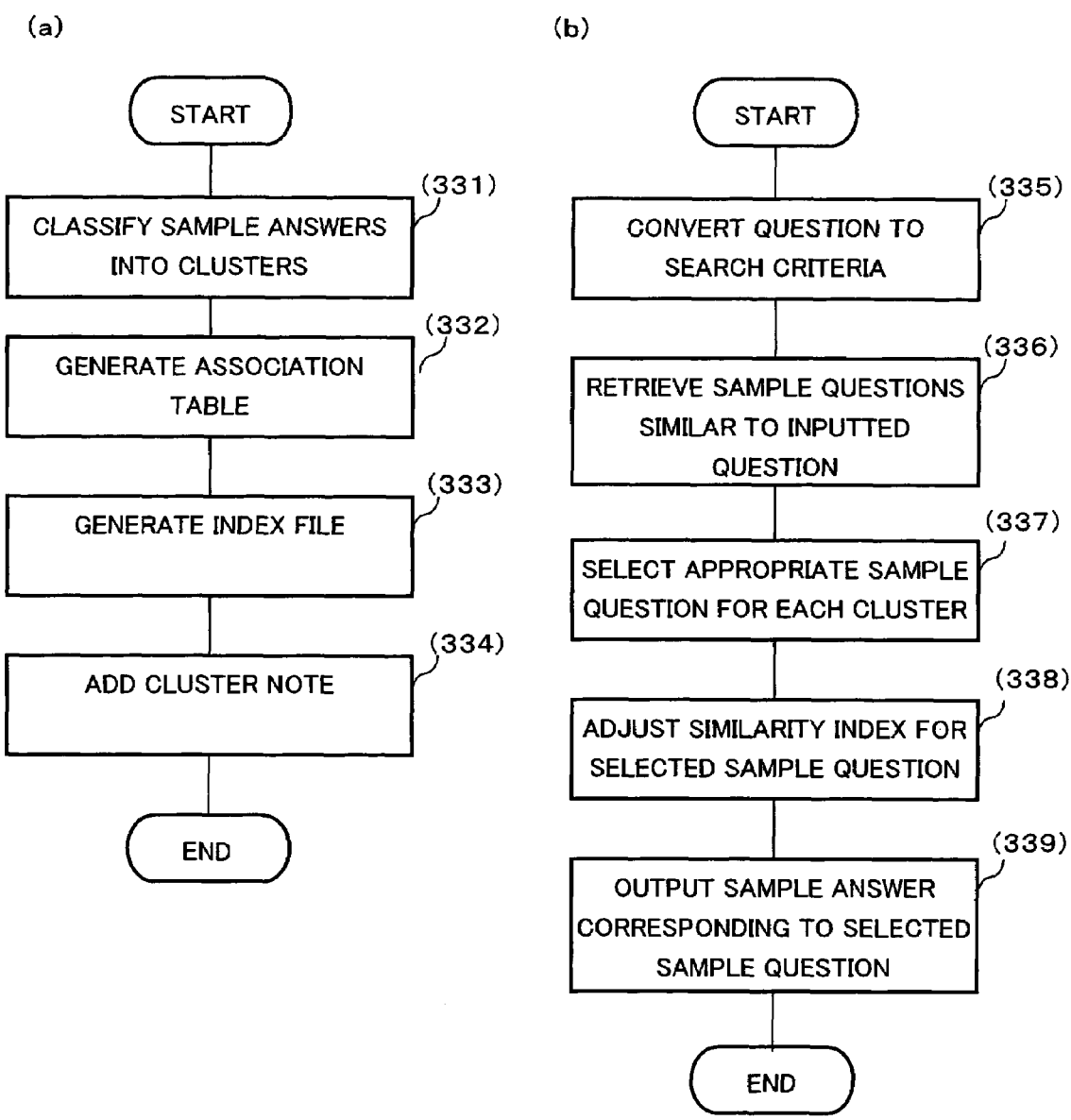
FIG. 13(a) and FIG. 13(b) are flow charts showing the operations of the document searching system.

Flow charts showing the operation of the document searching system are shown in FIG. 13. Furthermore, tables explaining the operation of the document searching system are shown in FIGS. 14(a) and 14(b).

The document searching system shown in FIG. 12 executes the preparatory processing consisting of each of the processes shown in FIG. 13(a) prior to the processing of searching for the sample answers for a new question.

The document clustering device 232 first divides a set of the sample answers stored in the document storage file 231 into the non-hierarchical clusters to generate the cluster table 233 as shown in FIG. 11(b) (Step 331 in FIG. 13(a)).

Next, the association table generating section 241 shown in FIG. 12 reads form the cluster table 233 the cluster IDs indicating the respective clusters to which the sample answers corresponding to the sample questions belong and the number of samples, referring to the cluster table 233, and stores this information as a cluster note corresponding to document IDs designated to the respective sample questions as shown in FIG. 14(a) to generate the association table 243 (Step 332 in FIG. 13). In the process of generating the association table 243 showing the duster note corresponding to each of the sample questions as described above, the sample questions can be classified according to the clusters to which their corresponding sample answers belong so that assemblies of the sample questions corresponding to assemblies of the sample answers belonging to the same clusters can be generated. A table including document IDs indicating sample questions corresponding to each of the clusters may of course be generated instead of the above-described association table 243 by the association table generating section 241.

Next, the index generating section 242 generates the index file 244 for words appearing in the sample questions stored in the document storage file 231 (Step 333 in FIG. 13), similarly to the index generating section 211 shown in FIG. 4, and furthermore, adds the cluster note to index information corresponding to each of the words according to the association table 243 described above (Step 334). At this time, the index generating section 242 generates the index file as shown in FIG. 14(b), for example, in a manner in which it reads, according to the document IDs indicating the documents including each of the words, the cluster note which is stored for each of the document IDs, referring to the association table 243 described above, and adds the cluster note to the index information.

After this processing is finished, the sample answers corresponding to a newly inputted question are searched for (refer to FIG. 13(b)).

The search criteria generating section 245 shown in FIG. 12 first converts the inputted question to the search criteria (Step 335 in FIG. 13), similarly to the search criteria generating section 213 shown in FIG. 4 and gives the search criteria to the document searching section 246.

The document searching section 246 retrieves sample questions including at least one word among words shown in the search criteria as similar documents, using the above-mentioned index file 244 (Step 336). At this time, the document searching section 246 gives to the sampling section 247 the search result including cluster notes corresponding to these sample questions together with document IDs indicating the sample questions, which are retrieved in the above manner, and their similarity indexes.

The sampling section 247 selects one sample question from each set of retrieved sample questions that have the same cluster note included in the search result (Step 337). At this time, the sampling section 247, for example, classifies by cluster the sample questions received from the document searching section 246, according to the corresponding cluster note and selects a sample question which is the most similar to the inputted question from each of the assemblies of the sample questions which are classified by cluster, according to the similarity indexes shown in the search result.

Next the sampling section 247 adjusts the similarity indexes corresponding to the sample questions selected in Step 337 described above (Step 338), using the cluster note. At this time, the sampling section 247 adjusts, for example, a similarity index R to calculate a final similarity index Rt, using Formula (3) which is expressed by a cluster score C reflecting the number of samples "n" in a cluster indicated by the cluster note corresponding to each of the sample questions, a coefficient "a" showing a ratio of the maximum value Rm of the similarity indexes to the maximum value Cm of the cluster score, and a coefficient $\alpha$ ($0 \leq \alpha \leq 1$) showing a degree of reflection of the cluster score.

$$Rt = a \times C \times \alpha + (1-\alpha) \times R \quad \text{Formula (3)}$$

Incidentally, the cluster score C may be, for example, a square root of the number of samples "n" in a cluster.

According to thus adjusted similarity index Rt, the sampling section 247 reads from the document storage file 231 the sample answers corresponding to the respective sample questions in the descending order of the similarity index Rt, and outputs them via the output device 235 (Step 339) to finish the processing.

As described above, the sample answers and the sample questions stored in the document storage file 231 are classified in advance, and when similar documents are searched for in the set of the sample questions in response to a new input of a question, one sample question is selected for each set of sample questions belonging to each cluster from the search results obtained by the document searching section 246 so that one search result can be selected from the search results for the set of the documents whose contents are highly similar to one another. This makes it possible to retrieve one answer corresponding to each of the assemblies consisting of the sample questions extremely similar to one another so that the output of many sample answers highly similar to one another can be prevented. This also makes it possible to present, as a search result, sample answers corresponding to sample questions which, though similar to the inputted question, includes various kinds of contents.

Moreover, the similarity indexes corresponding to the sample answers selected for each of the clusters are adjusted by the aforesaid cluster score, ranks are given to the sample questions according to the adjusted similarity indexes, and thereafter, the corresponding sample answers are presented, so that importance of the search results estimated from the sizes of the clusters to which the documents shown in the search results belong can be reflected in the order of presenting the retrieved sample answers.

Here, that the size of a cluster is large signifies that many similar questions were received and many answers to these questions were returned in the past, and therefore, sample answers belonging to a cluster including many samples are generally considered to have high importance. Therefore, presenting the search results according to the adjusted similarity indexes makes it possible to give higher priority to answers with higher effectiveness in the order of presenting.

In this way, the document searching system described above is capable of solving problems which are caused when necessary documents are to be retrieved directly from the accumulation of an enormous number of sample questions and sample answers which are stored in a support center and the like and is capable of speedily extracting sample answers which are most likely to be used as an effective answer, making effective use of the stored documents. This makes it possible to greatly reduce work burden on operators (or agents) in charge of user support and shorten time required for presenting answers to users, which improves serviceability. Therefore, the document searching system according to the present invention is greatly useful in fields such as support centers where effective use of an enormous number of stored documents is required.

The FAQ preparing system according to the present invention is explained next.

Figure 15:
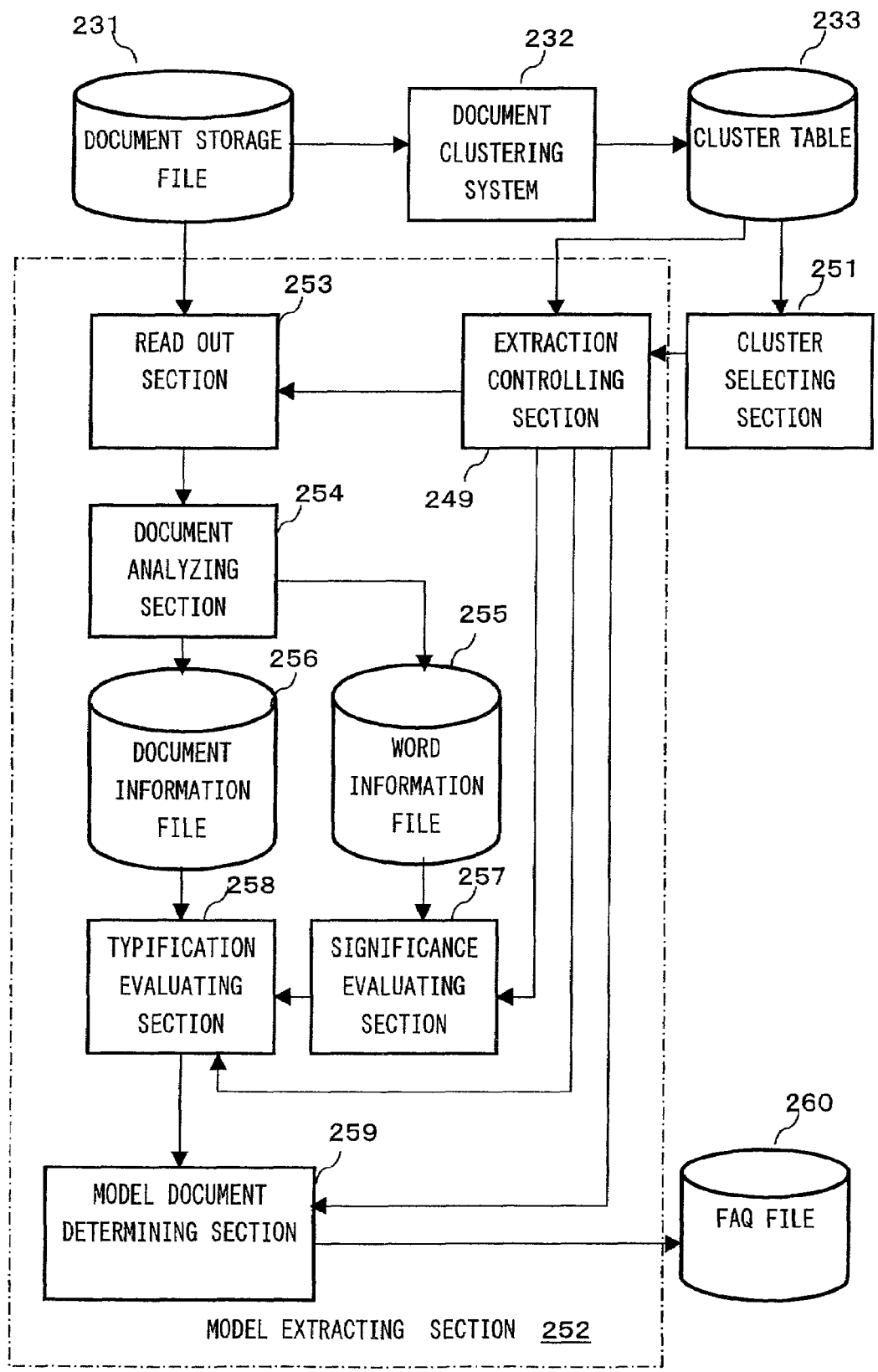
FIG. 15 is a block diagram showing an embodiment of the FAQ preparing system according to the present invention.

An embodiment of the FAQ preparing system according to the present invention is shown in FIG. 15.

In the FAQ preparing system shown in FIG. 15, the document clustering device 232 divides a number of the sample answers which are stored in the document storage file 231 into non-hierarchical clusters to generate the cluster table 233 in a manner as described above.

In FIG. 15, a cluster selecting section 251 selects clusters whose numbers of samples included therein are ranked in a higher range, according to the cluster table 233 and gives the selected clusters to a model extracting section 252 for processing.

In this model extracting section 252, a read out section 253 extracts from the document storage file 231 all the sample answers or sample questions belonging to the designated clusters according to an instruction from an extraction controlling section 249. Furthermore, a document analyzing section 254 analyzes each of the documents received from the read out section 253 to generate a word information file 255 showing an occurrence count of words in the set of these documents and a document information file 256 in which information showing words constituting each of the documents is stored. Furthermore, in response to the instruction from the extraction controlling section 249, a significance evaluating section 257 in the model extracting section 252 shown in FIG. 15 calculates word significance corresponding to each of the words according to the frequency of occurrence of each of the words in the concerning set of documents, with reference to the word information file 255. A typification evaluating section 258 calculates a typification degree of each of the documents according to the word significance and the information shown in the document information file 256 described above. A model document determining section 259 in FIG. 15 finds, for each of the clusters, a sample answer and a sample question having the highest typification degrees to store them in a FAQ file 260.

Here, it is explained how each of the sections shown in FIG. 15 corresponds to each of the units shown in FIG. 3.

The cluster selecting section 251 and the cluster table 233 shown in FIG. 15 achieve the functions of the sample counting unit 117 and the order determining unit 118 shown in FIG. 3. The function of the document analyzing unit 141 shown in FIG. 3 is achieved by the extraction controlling section 249, the read out section 253, and the document analyzing section 254 shown in FIG. 15. The functions of the document counting unit 142 and the significance evaluating unit 143 shown in FIG. 3 are achieved by the word information file 255 and the significance evaluating section 257 shown in FIG. 15. Meanwhile, the typification evaluating section 258 shown in FIG. 15 corresponds to the typification evaluating unit 144 shown in FIG. 3, and the model document determining section 259 and the FAQ file 260 shown in FIG. 15 correspond to the selecting unit 145 shown in FIG. 3.

Next, the operation of the FAQ preparing system is explained.

Figure 16:
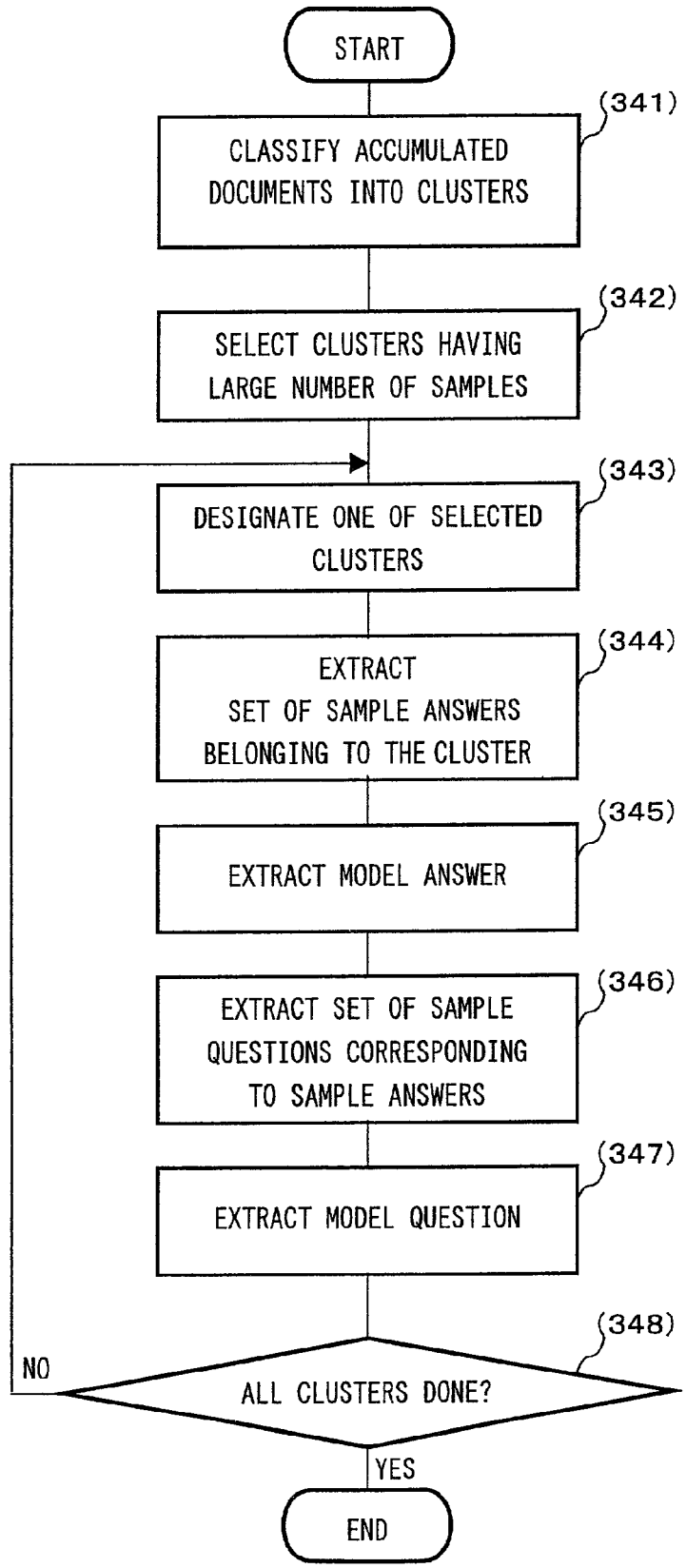
FIG. 16 is a flow chart showing the outline of a FAQ preparing operation.
Figure 17:
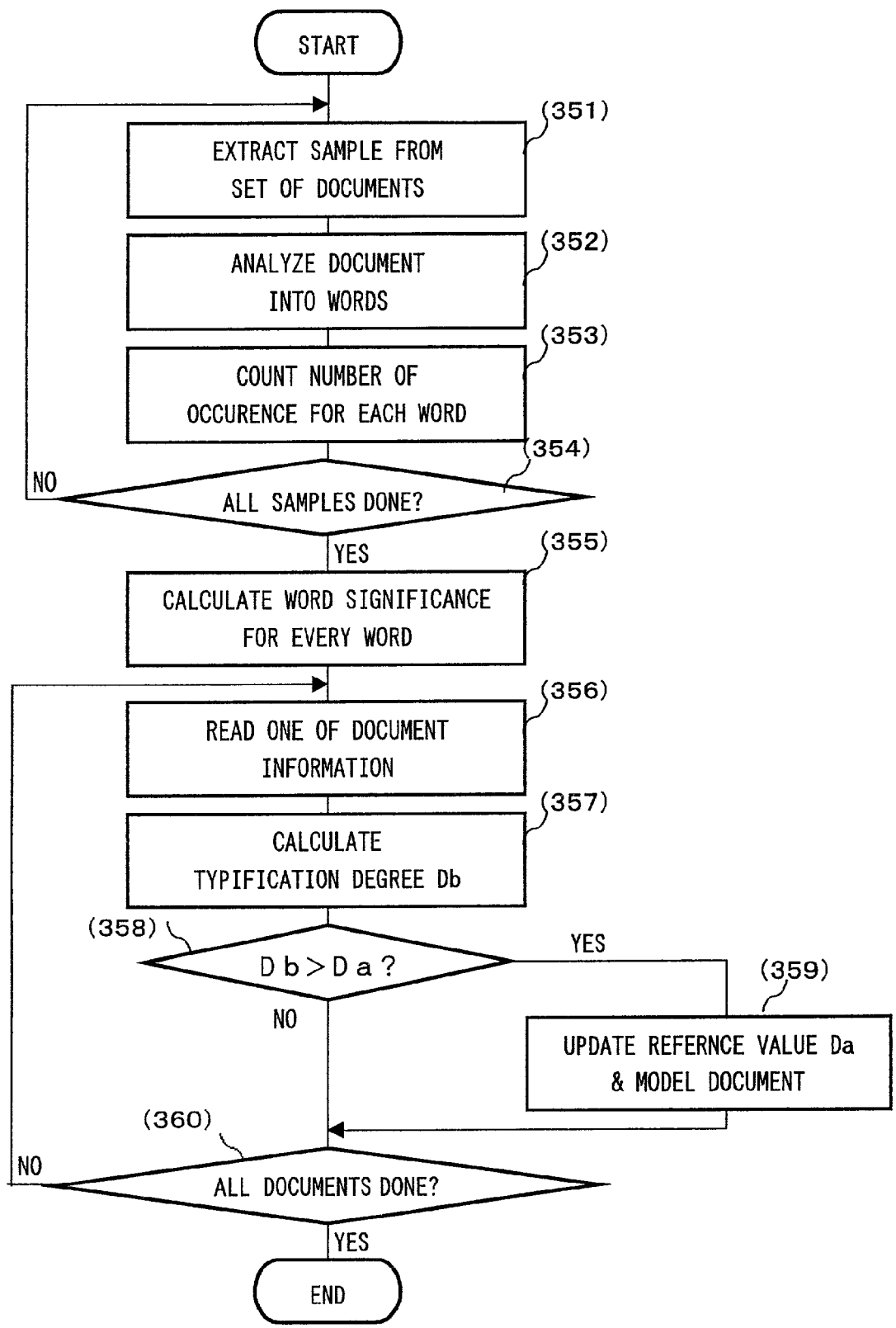
FIG. 17 is a flow chart showing the operation of extracting a model document from a set of documents.

A flow chart showing the outline of the FAQ preparing operation is shown in FIG. 16. Furthermore, a flow chart showing the operation of extracting a model document from a set of documents is shown in FIG. 17.

The document clustering device 232 divides the answers stored in the document storage file 231 into the non-hierarchical clusters (Step 341) to generate the cluster table 233.

The cluster selecting section 251 obtains the number of samples included in each of the clusters according to this cluster table 233 to select a 1st cluster to a Kth cluster in the descending order of the number of samples (Step 342) and notifies the extraction controlling section 249 of cluster IDs indicating these clusters.

The extraction controlling section 249 selects one cluster ID from these cluster IDs in sequence (Step 343), refers to the cluster table 233 described above according to this selected cluster ID, reads a set of documents IDs indicating sample answers belonging to this cluster, and instructs the read out section 253 to extract these documents. In response to the input of this instruction, the read out section 253 extracts the designated documents from the document storage file 231 (Step 344), and the set of these documents is used in model extracting processing (Step 345) by the document analyzing section 254, the significance evaluating section 257, the typification evaluating section 258, and the model document determining section 259.

Here, the operation of extracting a model document from the set of the documents is explained with reference to FIG. 17.

The document analyzing section 254 selects each sample in the set of the documents received from the read out section 253, namely, each of the documents, in sequence (Step 351) to analyze the selected document into words (Step 352). At this time, the document analyzing section 254 stores in the document information file 256 information on the words included in this document corresponding to a document ID indicating this document. At the same time, the document analyzing section 254 increments the occurrence counts, which are stored in the word information file 255, corresponding to the words which appear in this document (Step 353). Thereafter, the document analyzing section 254 judges whether or not the analysis for all the samples included in the above set of the documents is finished (Step 354), and in a case of negative judgment, returns to Step 351 to analyze a subsequent document.

In this way, all the documents belonging to the cluster are analyzed in sequence, and when the analysis for all the samples is finished, the document analyzing section 254 proceeds to Step 355 as positive judgment in Step 354. At this time, the information showing the occurrence count of each of the words in the set of the documents which are received from the read out section 253 has been stored in the word information file 255, and the information indicating the words constituting each of the documents has been stored in the document information file 256.

After that, the significance evaluating section 257 refers to the information stored in the word information file 255 in response to the instruction from the extraction controlling section 249, calculates, for each of the words, a score corresponding to its frequency of occurrence (hereinafter referred to as word significance) (Step 355), and gives the calculated word significance to the typification evaluating section 258.

The typification evaluating section 258, in response to the instruction from the extraction controlling section 249, reads the document information in sequence from the document information file 256 (Step 356), and, for example, adds up the word significance corresponding to the words shown in this document information to calculate a typification degree Db of the corresponding document (Step 357).

The model document determining section 259 compares the typification degree Db calculated in Step 357 with a reference value Da for the typification degree (Step 358), and in a case the typification degree Db exceeds the reference value Da (positive judgment in Step 358), it updates the reference value Da by the typification degree Db and stores in the FAQ file 260 a document ID indicating this document as a document ID indicating a model document corresponding to a cluster under processing (Step 359).

Thereafter, the extraction controlling section 249 judges whether or not the typification evaluating section 258 and the model document determining section 259 have executed the processing in the above-described Step 356 to Step 359 for all the samples included in the above-described set of the documents (Step 360), and in a case of negative judgment in Step 360, instructs them to return to Step 356 and process a subsequent document.

In this way, when the processing for all the samples are completed, the extraction controlling section 249 finishes the processing of extracting a model document from the concerning set of documents. Incidentally, at this time, the extraction controlling section 249 notifies the model document determining section 259 that the model extracting processing has been completed, and according to this notification, the model document determining section 259 can determine a model document to be stored in the FAQ file 260, corresponding to the concerning set.

Therefore, through execution of the processing from Step 351 to Step 360 described above for the set of the sample answers extracted in Step 344 in FIG. 16, a typical document can be extracted as a model document from the set of the sample answers (Step 345) to be stored in the FAQ file 260.

Similarly, when the read out section 253 extracts from the document storage file 231 a set of sample questions corresponding to respective sample answers which belong to a concerning cluster according to the instruction from the extraction controlling section 249 (Step 346) and the processing consisting of each of the processes shown in FIG. 17 is executed for this set of the documents, a typical sample question corresponding to the sample answers which belong to this cluster can be extracted as the model document (Step 347) to be stored in the FAQ file 260.

Therefore, through execution of the above-described processing for all the clusters selected in Step 342, FAQ can be automatically extracted from the documents stored in the document storage file 231.

Here, in the model document extracting processing shown in FIG. 17, each of the documents included in the document set is analyzed according to its constituent factors, namely, words, to calculate a typification degree for each of the documents. This typification degree indicates a degree to which each of the documents includes words which frequently appear in the documents included in the set and it can be considered that the typification degree objectively indicates how representative this document is. Therefore, the extraction of the model document in the above-described manner makes it possible to extract a typical document from a set consisting of many documents with high accuracy.

The invention is not limited to the above embodiments and various modifications may be made without departing from the spirit and scope of the invention. Any improvement may be made in part or all of the components.

What is claimed is:

1. A computer-implemented document searching system searching, in response to an input of a question concerning a situation or event a user encountered, for answers adequately corresponding to said question input, searching through plural answers sent in response to previous questions and each having descriptions of items including an explanation of a particular event and a countermeasure for a particular situation, the document searching system comprising:

a document storage file including plural questions and plural answers sent in response to the plural questions stored therein by corresponding the questions and answers to each other;

a similarity evaluating unit evaluating similarity between each of the plural answers stored in the document storage file with respect to all of the plural answers including each answer itself using the computer;

a clustering unit dividing the plural answers into non-hierarchical clusters according to evaluation results obtained by said similarity evaluating unit;

an association unit associating the plural questions with the non-hierarchical clusters to which the plural answers sent in response corresponding to the plural questions belong, respectively, and forming a cluster having a group including questions having similar answers sent in response thereto;

a searching unit judging similarity between a newly input question and each of the plural questions stored in the document storage file, and searching for candidate questions highly similar to the newly input question according to the similarity obtained by judging, the searching being executed in said document storage file;

a sampling unit extracting one candidate question from each cluster, by excluding all but one candidate question, from a collection of the candidate questions highly similar to the newly input question; and a result output unit outputting an answer from the plural answers stored in said document storage file, corresponding to the candidate question extracted by said sampling unit as a search result, and wherein said similarity evaluating unit comprises:

a similarity calculating unit calculating similarity between each combination of all combinations of two answers selected from said answers;

a candidate extracting unit extracting candidates for documents similar to a concerning document and generating a list showing the extracted candidates, an answer being a candidate for documents similar to the concerning document when the similarity calculated between a combination of the answer and the concerning document by the similarity calculating unit is over a predetermined threshold, the extracting done for all said answers by considering each answer as a concerning document;

a shared document detection unit collating the list of candidates for the documents similar to the concerning document to the list of candidates for another answer, said another answer being an answer included in said list of candidates for the documents similar to the concerning document, the collation being done for every combination of all said answers, and detecting, as a shared document, a candidate for documents similar to the concerning document and said another answer, that is shared in the list of candidates for both the concerning document and said another answer in each said combination; and a high similarity judging unit judging, for each combination of each of the answers and each of the candidates for the document similar to each of the answers, whether the answers in this combination are highly similar to each other, according to an appropriate index on the detected shared document and for outputting a judgment result as an evaluation result, and said clustering unit comprises:

a collecting unit collecting an identifier which specifies an answer highly similar to each of the answers according to the judgment result obtained by said high similarity judging unit;

a cluster generating unit generating a new cluster when the identifier collected for each of the answers satisfies a predetermined condition; and an arranging unit arranging a document, of said answers, into an existing cluster, when said existing cluster includes another answer indicated by the identifier collected for each of the answers.

2. A computer-implemented FAQ preparing system preparing FAQ including a questionnaire which appears at high frequency and an answer corresponding to the questionnaire, the preparation done using an accumulation of combinations of answers and questionnaires, the answers each including descriptions of items including an explanation of a particular event or a countermeasure for a particular situation and questionnaires demanding for the answers as their answers, the FAQ preparing system comprising:

a document storage file including the questionnaires and the answers which are returned in response to the questionnaires stored therein;

a similarity evaluating unit evaluating similarity between each of the answers to all the answers stored in the document storage file including each answer itself using the computer;

a clustering unit dividing the answers into non-hierarchical clusters according to evaluation results obtained by said similarity evaluating unit;

a sample counting unit calculating the number of samples included in each of the clusters;

an order determining unit ranking each of the clusters according to the number of samples included in each of the clusters; and a model extracting unit extracting a combination of a typical answer and a typical questionnaire, from answers belonging to the clusters which are within a predetermined ranking and questionnaires corresponding, to the answers, respectively, and for outputting the combination as the FAQ, and said similarity evaluating unit comprises:

a similarity calculating unit calculating similarity between each combination of all combinations of two answers selected from said answers;

a candidate extracting unit extracting candidates for documents similar to a concerning document and generating a list showing the extracted candidates, an answer being a candidate for documents similar to the concerning document when the similarity calculated between a combination of the answer and the concerning document is over a predetermined threshold, the extracting done for all said answers by considering each answer as a concerning document;

a shared document detection unit collating the list of candidates for documents similar to the concerning document to the list of candidates for another answer, said another answer being an answer included in said list of candidates for the documents similar to the concerning document, the collation being done for every combination of all said answers, and detecting, as a shared document, a candidate for documents similar to the concerning document and said another answer, that is shared in the list of candidates for both the concerning document and said another answer in each said combination; and a high similarity judging unit judging, for each combination of each of the answers and each of the candidates for the document similar to each of the answers, whether the answers in this combination are highly similar to each other, according to an appropriate index on the detected shared document and for outputting a judgment result as an evaluation result, and said clustering unit comprises:

a collecting unit collecting an identifier which specifies an answer highly similar to each of the answers according to the judgment result obtained;

a cluster generating unit generating a new cluster when the identifier collected for each of the answers satisfies a predetermined condition; and an arranging unit arranging a document, of said answers, into an existing cluster, when said existing cluster includes another answer indicated by the identifier collected for each of the answers.

3. The computer-implemented document searching system according to claim 1, wherein said result output unit comprises:

a score calculating unit calculating a score according to the number of samples included in each of the clusters concerning answers formed by the cluster generating unit, as a cluster score for each of the clusters;

a score adjusting unit adjusting, for each of the candidate questions which are extracted by said sampling unit, a similarity index obtained in said searching unit, according to the cluster score corresponding to the cluster including the answer that the candidate question is associated with; and a sorting unit rearranging the candidate questions according to the adjusted scores and outputting answers corresponding to the candidate questions as a search result.

4. A computer-readable medium having a document searching program stored therein for causing a computer to execute operations, said operations comprising:

storing a document storage file including plural questions and Plural answers sent in response to the plural questions by corresponding the questions and answers to each other;

evaluating similarity between each of the plural answers stored in the document storage file with respect to all of the plural answers including each answer itself using the computer;

dividing plural answers into non-hierarchical clusters based on evaluation of similarity of each plural answer;

associating plural questions with the non-hierarchical clusters of the plural answers, each cluster having a group of questions having similar answers sent in response thereto regardless of keyword content of said group of questions;

judging similarity between a new question and each of said plural questions and extracting a candidate question from each cluster by excluding all but one candidate question from a collection of the candidate questions highly similar to the new question; and outputting an answer from the plural answers stored in said document storage file corresponding to the candidate question, extracted as a search result;

wherein said evaluation comprises:

calculating a similarity between each combination of all combinations of two question, where said question is most answers selected from said answers;

extracting candidates for documents similar to a concerning document and Of each cluster generating a list showing the extracted candidates, an answer being a candidate for documents similar to the concerning document when the similarity calculated between a combination of the answer and the concerning document is over a predetermined threshold, the extracting done for all said answers by considering each answer as a concerning document;

collating the list of candidates for the documents similar to the concerning document to the list of candidates for another answer, said another answer being an answer included in said list of candidates for the documents similar to the concerning document, the collation being done for every combination of all said answers, and detecting, as a shared document, a candidate for documents similar to the concerning document and said another answer, that is shared in the list of candidates for both the concerning document and said another answer in each said combination: and judging a high similarity, for each combination of each of the answers and each of the candidates for the document similar to each of the answers, whether the answers in this combination are highly similar to each other, according to an appropriate index on the detected shared document and for outputting a judgment result as an evaluation result, and said dividing comprises:

collecting an identifier which specifies an answer highly similar to each of the answers according to the judgment result obtained by said high similarity judging;

generating a new cluster when the identifier collected for each of the answers satisfies a predetermined condition; and arranging a document, of said answers, into an existing cluster, when said existing cluster includes another answer indicated by the identifier collected for each of the answers.

* * * * *

UNITED STATES PATENT AND TRADEMARK OFFICE
CERTIFICATE OF CORRECTION

PATENT NO. : 7,349,899 B2
APPLICATION NO. : 10/059288
DATED : March 25, 2008
INVENTOR(S) : Isao Namba Page 1 of 1

It is certified that error appears in the above-identified patent and that said Letters Patent is hereby corrected as shown below:

Column 23, Lines 7-8, change "corresponding," to --corresponding--.

Column 24, Line 11, change "Plural" to --plural--.

Column 24, Line 32, change "question," to --question--.

Column 24, Lines 35-36, after "combinations of two" delete "question, where said question is most".

Column 24, Line 38, after "document and" delete "Of each cluster".

Column 24, Line 56, change "combination:" to --combination;--.

Signed and Sealed this

Twelfth Day of August, 2008

JON W. DUDAS
*Director of the United States Patent and Trademark Office*